United States Patent
Habets et al.

(10) Patent No.: US 10,331,396 B2
(45) Date of Patent: Jun. 25, 2019

(54) FILTER AND METHOD FOR INFORMED SPATIAL FILTERING USING MULTIPLE INSTANTANEOUS DIRECTION-OF-ARRIVAL ESTIMATES

(71) Applicant: Fraunhofer-Gesellschaft zur Foerderung der angewandten Forschung e.V., Munich (DE)

(72) Inventors: Emanuel Habets, Spardorf (DE); Oliver Thiergart, Forchheim (DE); Sebastian Braun, Eichstaett (DE); Maja Taseska, Erlangen (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 14/743,896

(22) Filed: Jun. 18, 2015

(65) Prior Publication Data
US 2015/0286459 A1    Oct. 8, 2015

Related U.S. Application Data

(63) Continuation of application No. PCT/EP2013/074650, filed on Nov. 25, 2013.
(Continued)

(30) Foreign Application Priority Data
May 24, 2013    (EP) .................................... 13169163

(51) Int. Cl.
*G06F 3/16*    (2006.01)
*G10K 11/34*    (2006.01)
(Continued)

(52) U.S. Cl.
CPC .............. *G06F 3/16* (2013.01); *G10K 11/346* (2013.01); *H04R 3/005* (2013.01); *H04R 3/02* (2013.01)

(58) Field of Classification Search
CPC ......... G06F 3/16; G10K 11/346; H04R 3/005; H04R 3/02
(Continued)

(56) References Cited

U.S. PATENT DOCUMENTS

2007/0050441 A1    3/2007  Taenzer et al.
2007/0127736 A1    6/2007  Christoph et al.
(Continued)

FOREIGN PATENT DOCUMENTS

CN    1565144 A    1/2005
CN    101288334 A    10/2008
(Continued)

OTHER PUBLICATIONS

Allen, Jont B. et al., "Image Method for Efficiently Simulating Small-RoomAcoustics", Journal of the Acoustical Society of America, vol. 65, No. 4, Apr. 1979, pp. 943-950.
(Continued)

*Primary Examiner* — Paul C McCord
(74) *Attorney, Agent, or Firm* — Perkins Coie LLP; Michael Glenn

(57) ABSTRACT

A filter for generating an audio output signal includes a plurality of audio output signal samples based on two or more input microphone signals. The audio output signal and the two or more input microphone signals are represented in a time-frequency domain, wherein each of the plurality of audio output signal samples is assigned to a time-frequency bin of a plurality of time-frequency bins. The filter includes a weights generator being adapted to receive, for each of the plurality of time-frequency bins, direction-of-arrival infor-
(Continued)

mation and weighting information. Moreover, the filter includes an output signal generator for generating the audio output signal.

15 Claims, 13 Drawing Sheets

Related U.S. Application Data

(60) Provisional application No. 61/740,866, filed on Dec. 21, 2012.

(51) Int. Cl.
*H04R 3/00* (2006.01)
*H04R 3/02* (2006.01)

(58) Field of Classification Search
USPC .......................................................... 700/94
See application file for complete search history.

(56) References Cited

U.S. PATENT DOCUMENTS

| | | | | |
|---|---|---|---|---|
| 2008/0004729 | A1* | 1/2008 | Hiipakka | H04R 5/04 700/94 |
| 2008/0298597 | A1* | 12/2008 | Turku | H04S 5/00 381/27 |
| 2008/0298610 | A1* | 12/2008 | Virolainen | H04S 7/302 381/307 |
| 2009/0264114 | A1* | 10/2009 | Virolainen | H04M 3/56 455/416 |
| 2011/0232989 | A1 | 9/2011 | Lee et al. | |
| 2012/0027219 | A1 | 2/2012 | Kale et al. | |
| 2013/0058492 | A1* | 3/2013 | Silzle | H04R 5/027 381/59 |
| 2013/0259243 | A1* | 10/2013 | Herre | G10L 19/02 381/57 |

FOREIGN PATENT DOCUMENTS

| | | |
|---|---|---|
| JP | 2004289762 A | 10/2004 |
| WO | 03015464 A2 | 2/2003 |
| WO | 2005004532 A1 | 1/2005 |
| WO | 2008041878 A2 | 4/2008 |
| WO | 2012072798 A1 | 6/2012 |

OTHER PUBLICATIONS

Benesty, J et al., "Microphone Array Signal Processing", Springer Topics in Signal Processing, vol. 1, 2008, 245 pages.
Benesty, J. et al., "Speech Enhancement in the STFT Domain", SpringerBriefs in Electrical and Computer Engineering. Springer-Verlag, 2012, 4 pages.
Bitzer, et al., "An alternative implementation of the superdirective beamformer", Applications of Signal Processing to Audio and Acoustics, New Paltz, New York, Oct. 17-20, 1999, pp. 7-10.
Cook, Richard et al., "Measurement of correlation coefficients in reverberant sound fields", Journal of The Acoustical Society of America, vol. 27, No. 6, pp. 1072-1077, Nov. 1955.
Cox, H. et al., "Robust Adaptive Beamforming", IEEE Transactions on Acoustics, Speech, and Signal Processing, vol. ASSP-35, No. 10, Oct. 1987, pp. 1365-1376.
Del Galdo, "Generating Virtual Microphone Signals Using Geometrical Information Gathered by Distributed Arrays", Fraunhofer Institute for Integrated Circuits IIS, Erlangen, Germany; International Audio Laboratories Erlangen, Germany; 2011 Joint Workshop on Hands-Free Speech Communication and Microphone Arrays; May 30-Jun. 1, 2011, pp. 185-190.
Doclo, S. et al., "Acoustic Beamforming for Hearing Aid Applications", Handbook on Array Processing and Sensor Networks, John Wiley & Sons, Inc., 2008, 35 pages.
Frost, O.L. , "An Algorithm for Linearly Constrained Adaptive Array Processing", Proceedings of the IEEE, vol. 60, No. 8, Aug. 1972, pp. 926-935.
Gannot, S. et al., "Adaptive Beamforming and Postfiltering", Springer Handbook of Speech Processing, Springer Berlin Heidelberg, 2008, pp. 945-978.
Gannot, S. et al., "Signal Enhancement Using Beamforming and Nonstationarity with Applications to Speech", IEEE Transactions on Signal Processing, vol. 49, No. 8, Aug. 2001, pp. 1614-1626.
Grant, M. et al., "Graph Implementations for Nonsmooth Convex Programs", Recent Advances in Learning and Control, LNCIS 371, Springer-Verlag Berlin Heidelberg 2008, 2008, pp. 95-110.
Grant, M. C. et al., "The CVX Users' Guide Release 2.1", CVX Research, Inc., Jun. 10, 2015, 99 pages.
Habets, E. et al., "Joint Dereverberation and Noise Reduction Using a Two-Stage Beamforming Approach", 2011 Joint Workshop on Hands-Free Speech Communication and Microphone Arrays (HSCMA), May 30-Jun. 1, 2011, pp. 191-195.
Habets, E.A.P , "Room Impulse Response Generator", [Online] Available: http://home.tiscali.nl/ehabets/rirgenerator.html; see also: http://web.archive.org/web/20120730003147/http://home.tiscali.nl/ehabets/rir_generator.html, Sep. 20, 2010, 21 pages.
Herbordt, W. et al., "Adaptive Beamforming for Audio Signal Acquisition", Adaptive Signal Processing; Part of the series Signals and Communication Technology; Springer-Verlag Berlin Heidelberg, 2003, pp. 155-194.
Hoshuyama, O. et al., "A Robust Adaptive Beamformer for Microphone Arrays with a Blocking Matrix Using Constrained Adaptive Filters", IEEE Transactions on Signal Processing, vol. 47, No. 10, Oct. 1999, pp. 2677-2684.
Kallinger, M. et al., "Dereverberation in the Spatial Audio Coding Domain", 130th Audio Engineering Society Convention, Convention Paper 8429, London UK, May 13-16, 2011, 9 pages.
Kallinger, Markus et al., "Spatial filtering using directional audio coding parameters", Acoustics, Speech and Signal Processing, Apr. 19, 2009, p. 217-220, XP031459205, Spatial Filtering using Directional Audio Coding Parameters, in Proc. IEEE Int. Conf. on Acoustics, Speech, and Signal Processing (ICASSP), Apr. 2009, pp. 217-220.
Krueger, A. et al., "Speech Enhancement With a GSC-Like Structure Employing Eigenvector-Based Transfer Function Ratios Estimation", IEEE Transactions on Audio, Speech, and Language Processing, vol. 19, No. 1, Jan. 2011, pp. 206-219.
Markovich, S. et al., "Multichannel Eigenspace Beamforming in a Reverberant Noisy Environment With Multiple Interfering Speech Signals", IEEE Transactions on Audio, Speech, and Language Processing, vol. 17, No. 6, Aug. 2009, pp. 1071-1086.
Nordholm, S. et al., "Adaptive Array Noise Suppression of Handsfree Speaker Input in Cars", IEEE Transactions on Vehicular Technology, vol. 42, No. 4, Nov. 1993, pp. 514-518.
Rao, B. et al., "Performance Analysis of Root-Music", Twenty-Second Asilomar Conference on Signals, Systems & Computers, Oct. 31-Nov. 2, 1988, pp. 578-582.
Reuven, G. et al., "Dual-Source Transfer-Function Generalized Sidelobe Canceller", IEEE Transactions on Audio, Speech, and Language Processing, vol. 16, No. 4, May 2008, pp. 711-727.
Rohdenburg, T. et al., "Combined Source Tracking and Noise Reduction for Application in Hearing Aids", Conference Paper in 8. ITG-Fachtagung Sprachkommunikation, Aachen, Germany, Oct. 8-10, 2008, 4 pages.
Roy, R. et al., "ESPRIT—Estimation of Signal Parameters Via Rotational Invariance Techniques", IEEE Transactions on Acoustics, Speech, and Signal Processing, vol. 37, No. 7, Jul. 1989, pp. 984-995.
Talmon, R. , "Convolutive Transfer Function Generalized Sidelobe Canceler", IEEE Transactions on Audio, Speech, and Language Processing, vol. 17, No. 7, Sep. 2009, pp. 1420-1434.
Taseska, M. et al., "MMSE-Based Blind Source Extraction in Diffuse Noise Fields Using a Complex Coherence-Based A Priori SAP Estimator", International Workshop on Acoustic Signal Enhancement 2012, Aachen, Sep. 4-6, 2012, 4 pages.

(56) References Cited

OTHER PUBLICATIONS

Tashev, I. et al., "Microphone Array for Headset With Spatial Noise Suppressor", Proceedings of Ninth International Workshop on Acoustic, Echo and Noise Control IWAENC, 2005, 4 pages.
Thiergart, O. et al., "Sound Field Model Violations in Parametric Spatial Sound Processing", International Workshop on Acoustic Signal Enhancement 2012, Aachen, Sep. 4-6, 2012, 4 pages.
Van Trees, H.L. , "Optimum Array Processing", Part IV of Detection, Estimation, and Modulation Theory; John Wiley & Sons, Apr. 2002, 18 pages.

* cited by examiner

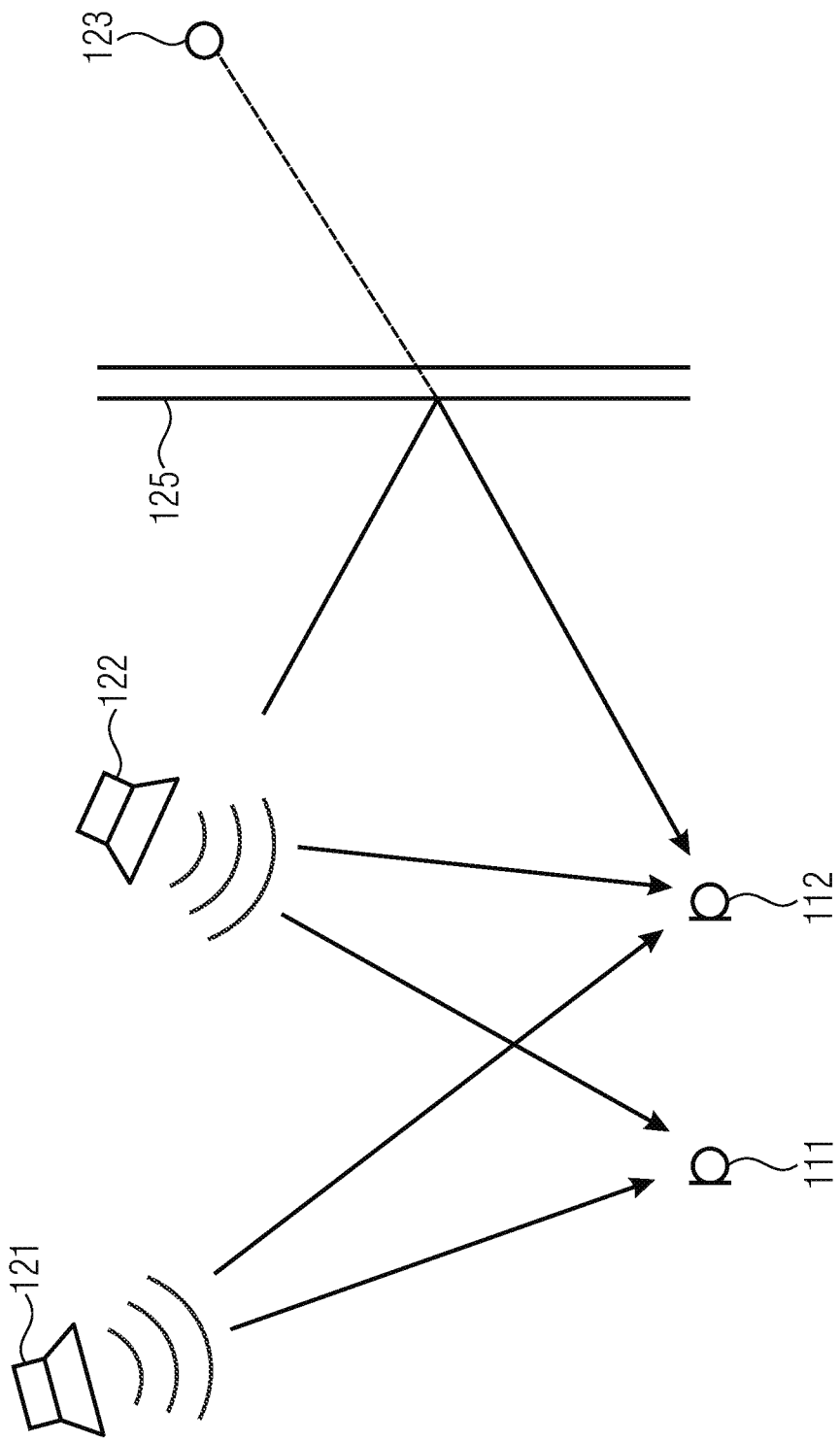

TRUE Ψ (k, n) [dB]

ESTIMATED $\Psi(k, n)$ [dB]

MEAN DI

MEAN WNG

FILTER AND METHOD FOR INFORMED SPATIAL FILTERING USING MULTIPLE INSTANTANEOUS DIRECTION-OF-ARRIVAL ESTIMATES

CROSS-REFERENCE TO RELATED APPLICATIONS

This application is a continuation of copending International Application No. PCT/EP2013/074650, filed Nov. 25, 2013, which is incorporated herein in its entirety by this reference thereto, and additionally claims priority from U.S. Application No. 61/740,866, filed Dec. 21, 2012, and European Application 13169163.6, filed May 24, 2013, both of which are also incorporated herein in their entirety by this reference thereto.

The present invention relates to audio signal processing, and, in particular, to a filter and a method for informed spatial filtering using multiple instantaneous direction-of-arrival estimates.

BACKGROUND OF THE INVENTION

Extracting sound sources in noisy and reverberant conditions is commonly found in modern communication systems. In the last four decades, a large variety of spatial filtering techniques have been proposed to accomplish this task. Existing spatial filters are optimal when the observed signals are conform to the signal model and when the information that may be used to compute the filters is accurate. In practice, however, the signal model is often violated and estimating the information that may be used is a major challenge.

Existing spatial filters can be broadly classified into linear spatial filters (see, e.g, [1, 2, 3, 4]) and parametric spatial filters (see, e.g., [5, 6, 7, 8]). In general, linear spatial filters may use an estimate of the one or more propagation vectors or the second-order statistics (SOS) of the desired one or more sources plus the SOS of the interference. Some spatial filters are designed to extract a single source signal, either reverberant or dereverberated, (see, e.g., [9, 10, 11, 12, 13, 14, 15, 16]), while others have been designed to extract the sum of two or more reverberant source signals (see, e.g., [17, 18]). The aforementioned methods involve prior knowledge of the direction of the desired one or more sources or a period in which only the desired sources are active, either separately or simultaneously.

A drawback of these methods is the inability to adapt sufficiently quickly to new situations, for example, source movements or competing speakers that become active when the desired source is active. Parametric spatial filters are often based on a relatively simple signal model, e.g., the received signal in the time-frequency domain consists of a single plane wave plus diffuse sound, and are computed based on instantaneous estimates of the model parameters. Advantages of parametric spatial filters are a highly flexible directional response, a comparatively strong suppression of diffuse sound and interferers, and the ability to quickly adapt to new situations. However, as shown in [19], the underlying single plane wave signal model can easily be violated in practice which strongly degrades the performance of the parametric spatial filters. It should be noted that state-of-the-art parametric spatial filters use all available microphone signals to estimate the model parameters, while only a single microphone signal and a real-valued gain is used to compute the final output signal. An extension to combine the multiple available microphone signals to find an enhanced output signal is not straight-forward.

It would therefore be highly appreciated if improved concepts for obtaining a desired spatial response to the sound sources would be provided.

SUMMARY

According to an embodiment, a filter for generating an audio output signal, including a plurality of audio output signal samples, based on two or more input microphone signals, wherein the audio output signal and the two or more input microphone signals are represented in a time-frequency domain, wherein each of the plurality of audio output signal samples is assigned to a time-frequency bin of a plurality of time-frequency bins, may have: a weights generator being adapted to receive, for each of the plurality of time-frequency bins, direction-of-arrival information of one or more sound components of one or more sound sources or position information of one or more sound sources, and being adapted to generate weighting information for each of the plurality of time-frequency bins depending on the direction-of-arrival information of the one or more sound components of the one or more sound sources of said time-frequency bin or depending on the position information of the one or more sound sources of said time-frequency bin; wherein the weights generator is adapted to generate the weighting information for each of the plurality of time-frequency bins depending on first noise information indicating information on a first coherence matrix of first noise components of the two or more input microphone signals and depending on second noise information indicating information on a second coherence matrix of second noise components of the two or more input microphone signals; and an output signal generator for generating the audio output signal by generating for each of the plurality of time-frequency bins one of the plurality of audio output signal samples, which is assigned to said time-frequency bin, depending on the weighting information of said time-frequency bin and depending on an audio input sample, being assigned to said time-frequency bin, of each of the two or more input microphone signals.

According to another embodiment, a method for generating an audio output signal, including a plurality of audio output signal samples, based on two or more input microphone signals, wherein the audio output signal and the two or more input microphone signals are represented in a time-frequency domain, wherein each of the plurality of audio output signal samples is assigned to a time-frequency bin of a plurality of time-frequency bins, may have the steps of: receiving, for each of the plurality of time-frequency bins, direction-of-arrival information of one or more sound components of one or more sound sources or position information of one or more sound sources, generating weighting information for each of the plurality of time-frequency bins depending on the direction-of-arrival information of the one or more sound components of the one or more sound sources of said time-frequency bin or depending on the position information of the one or more sound sources of said time-frequency bin; wherein generating the weighting information for each of the plurality of time-frequency bins is conducted depending on first noise information indicating information on a first coherence matrix of first noise components of the two or more input microphone signals and depending on second noise information indicating information on a second coherence matrix of second noise components of the two or more input microphone signals; and generating the audio output signal by generating for each of the plurality of time-frequency bins one of the plurality of audio output signal samples, which is assigned to said time-frequency bin, depending on the weighting information of said time-frequency bin and depending on an audio input sample, being assigned to said time-frequency bin, of each of the two or more input microphone signals.

Another embodiment may have a computer program for implementing the method of claim 14 when being executed on a computer or signal processor.

A filter for generating an audio output signal, comprising a plurality of audio output signal samples, based on two or more input microphone signals is provided. The audio output signal and the two or more input microphone signals are represented in a time-frequency domain, wherein each of the plurality of audio output signal samples is assigned to a time-frequency bin of a plurality of time-frequency bins.

The filter comprises a weights generator being adapted to receive, for each of the plurality of time-frequency bins, direction-of-arrival information of one or more sound components of one or more sound sources or position information of one or more sound sources, and being adapted to generate weighting information for each of the plurality of time-frequency bins depending on the direction-of-arrival information of the one or more sound components of the one more sound sources of said time-frequency bin or depending on the position information of the one or more sound sources of said time-frequency bin.

Moreover, the filter comprises an output signal generator for generating the audio output signal by generating for each of the plurality of time-frequency bins one of the plurality of audio output signal samples, which is assigned to said time-frequency bin, depending on the weighting information of said time-frequency bin and depending on an audio input sample, being assigned to said time-frequency bin, of each of the two or more input microphone signals.

Embodiments provide a spatial filter for obtaining a desired response for at most L simultaneous active sound sources. The provided spatial filter is obtained by minimizing the diffuse-plus-noise power at the output of the filter subject to L linear constraints. In contrast to state-of-the-art concepts, the L constraints are based on instantaneous narrowband direction-of-arrival estimates. In addition, novel estimators for the diffuse-to-noise ratio/diffuse power are provided which exhibit a sufficiently high temporal and spectral resolution to achieve both dereverberation and noise reduction.

According to some embodiments, concepts are provided for obtaining a desired, arbitrary spatial response for at most L sound sources being simultaneously active per time-frequency instant. For this purpose, instantaneous parametric information (IPI) about the acoustic scene is incorporated into the design of a spatial filter resulting in an "informed spatial filter".

In some embodiments, such an informed spatial filter, for example, combines all available microphone signals based on complex weights to provide an enhanced output signal.

According to embodiments, the informed spatial filter may, for example, be realized as a linearly constrained minimum variance (LCMV) spatial filter or as a parametric multichannel Wiener filter.

In some embodiments, the provided informed spatial filter is, for example, obtained by minimizing the diffuse plus self-noise power subject to L linear constraints.

In some embodiments, in contrast to conventional technology, the L constraints are based on instantaneous direction-of-arrival (DOA) estimates and the resulting responses to the L DOAs correspond to the specific desired directivity.

Moreover, novel estimators for the signal and noise statistics that may be used, e.g., the diffuse-to-noise ratio (DNR), are provided which exhibit a sufficiently high temporal and spectral resolution, e.g., to reduce both reverberation and noise.

Furthermore, a method for generating an audio output signal, comprising a plurality of audio output signal samples, based on two or more input microphone signals is provided. The audio output signal and the two or more input microphone signals are represented in a time-frequency domain, wherein each of the plurality of audio output signal samples is assigned to a time-frequency bin of a plurality of time-frequency bins. The method comprises:

receiving, for each of the plurality of time-frequency bins ((k, n)), direction-of-arrival information of one or more sound components of one or more sound sources or position information of one or more sound sources.

renerating weighting information for each of the plurality of time-frequency bins depending on the direction-of-arrival information of the one or more sound components of the one more sound sources of said time-frequency bin or depending on the position information of the one or more sound sources of said time-frequency bin. And:

generating the audio output signal by generating for each of the plurality of time-frequency bins ((k, n)) one of the plurality of audio output signal samples, which is assigned to said time-frequency bin ((k, n)), depending on the weighting information of said time-frequency bin ((k, n)) and depending on an audio input sample, being assigned to said time-frequency bin ((k, n)), of each of the two or more input microphone signals.

Moreover, a computer program for implementing the above-described method when being executed on a computer or signal processor is provided.

BRIEF DESCRIPTION OF THE DRAWINGS

Embodiments of the present invention will be detailed subsequently referring to the appended drawings, in which:

FIG. 1b illustrates a possible application scenario for a filter according an embodiment.

DETAILED DESCRIPTION OF THE INVENTION

Figure 1A:
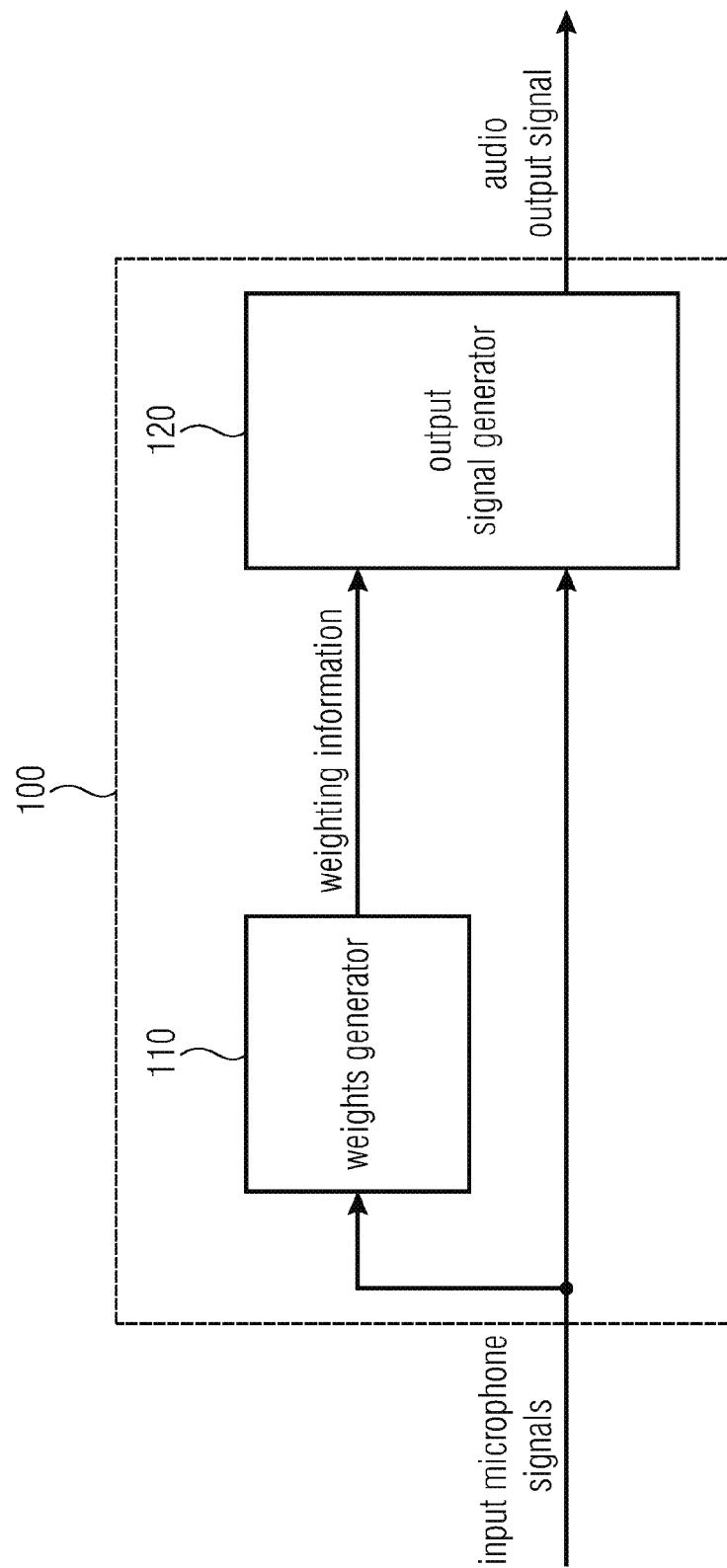
FIG. 1a illustrates a filter according to an embodiment.

FIG. 1a illustrates a filter 100 for generating an audio output signal, comprising a plurality of audio output signal samples, based on two or more input microphone signals is provided. The audio output signal and the two or more input microphone signals are represented in a time-frequency domain, wherein each of the plurality of audio output signal samples is assigned to a time-frequency bin (k, n) of a plurality of time-frequency bins (k, n).

The filter 100 comprises a weights generator 110 being adapted to receive, for each of the plurality of time-frequency bins (k, n), direction-of-arrival information of one or more sound components of one or more sound sources or position information of one or more sound sources, and being adapted to generate weighting information for each of the plurality of time-frequency bins (k, n) depending on the direction-of-arrival information of the one or more sound components of the one more sound sources of said time-frequency bin (k, n) or depending on the position information of the one or more sound sources of said time-frequency bin (k, n).

Moreover, the filter comprises an output signal generator 120 for generating the audio output signal by generating for each of the plurality of time-frequency bins (k, n) one of the plurality of audio output signal samples, which is assigned to said time-frequency bin (k, n), depending on the weighting information of said time-frequency bin (k, n) and depending on an audio input sample, being assigned to said time-frequency bin (k, n), of each of the two or more input microphone signals.

For example, each of the two or more input microphone signals comprises a plurality of audio input samples, wherein each of the audio input samples is assigned to one of the time-frequency bins (k, n), and the audio signal generator 120 may be adapted to generate one of the plurality of audio output signal samples, which is assigned to said time-frequency bin (k, n), depending on the weighting information of said time-frequency bin (k, n) and depending on one of the audio input samples of each of the two or more input microphone signals, namely, e.g., depending on one of the audio input samples of each of the two or more input microphone signals, which is assigned to said time-frequency bin (k, n).

For each audio output signal sample to be generated of each time-frequency bin (k, n), the weights generator 110 newly generates individual weighting information. The output signal generator 120 then generates the audio output signal sample of the considered time-frequency bin (k, n) based on the weighting information generated for that time-frequency bin. In other words, new weighting information is calculated by the weights generator 110 for each time-frequency bin for which an audio output signal sample is to be generated.

When generating the weighting information, the weights generator 110 is adapted to take information of one or more sound sources into account.

For example, the weights generator 110 may take a position of a first sound source into account. In an embodiment, the weights generator may also take a position of a second sound source into account.

Or, for example, the first sound source may emit a first sound wave with a first sound component. The first sound wave with the first sound component arrives at a microphone and the weights generator 110 may take the direction-of-arrival of the first sound component/of the sound wave into account. By this, the weights generator 110 takes information on the first sound source into account. Moreover, the second sound source may emit a second sound wave with a second sound component. The second sound wave with the second sound component arrives at the microphone and the weights generator 110 may take the direction-of-arrival of the second sound component/of the second sound wave into account. By this, the weights generator 110 takes also information on the second sound source into account.

FIG. 1b illustrates a possible application scenario for a filter 100 according an embodiment. A first sound wave with a first sound component is emitted by a first loudspeaker 121 (a first sound source) and arrives at a first microphone 111. The direction of arrival of the first sound component (=the direction of arrival of the first sound wave) at the first microphone 111 is taken into account. Moreover, a second sound wave with a second sound component is emitted by a second loudspeaker 122 (a second sound source) and arrives at the first microphone 111. The weights generator 110 is capable to also take the direction of arrival of the second sound component at the first microphone 111 into account to determine the weighting information. Moreover, the direction of arrival of sound components (=direction of arrival of sound waves) at other microphones, such as microphone 112 may also be taken into account by the weights generator to determine the weighting information.

It should be noted that sound sources may, for example, be physical sound sources that physically exist in an environment, for example loudspeakers, musical instruments or a person speaking.

However, it should be noted that mirror image sources are also sound sources. For example, a sound wave emitted by a speaker 122 may be reflected by a wall 125 and the sound wave then appears to be emitted from a position 123 being different than the position of the speaker that in fact emitted the sound wave. Such a mirror image source 123 is also considered as a sound source. A weights generator 110 may be adapted to generate the weighting information depending on direction-of-arrival information relating to a mirror image source or depending on position information on one, two or more mirror image sources.

Figure 2:
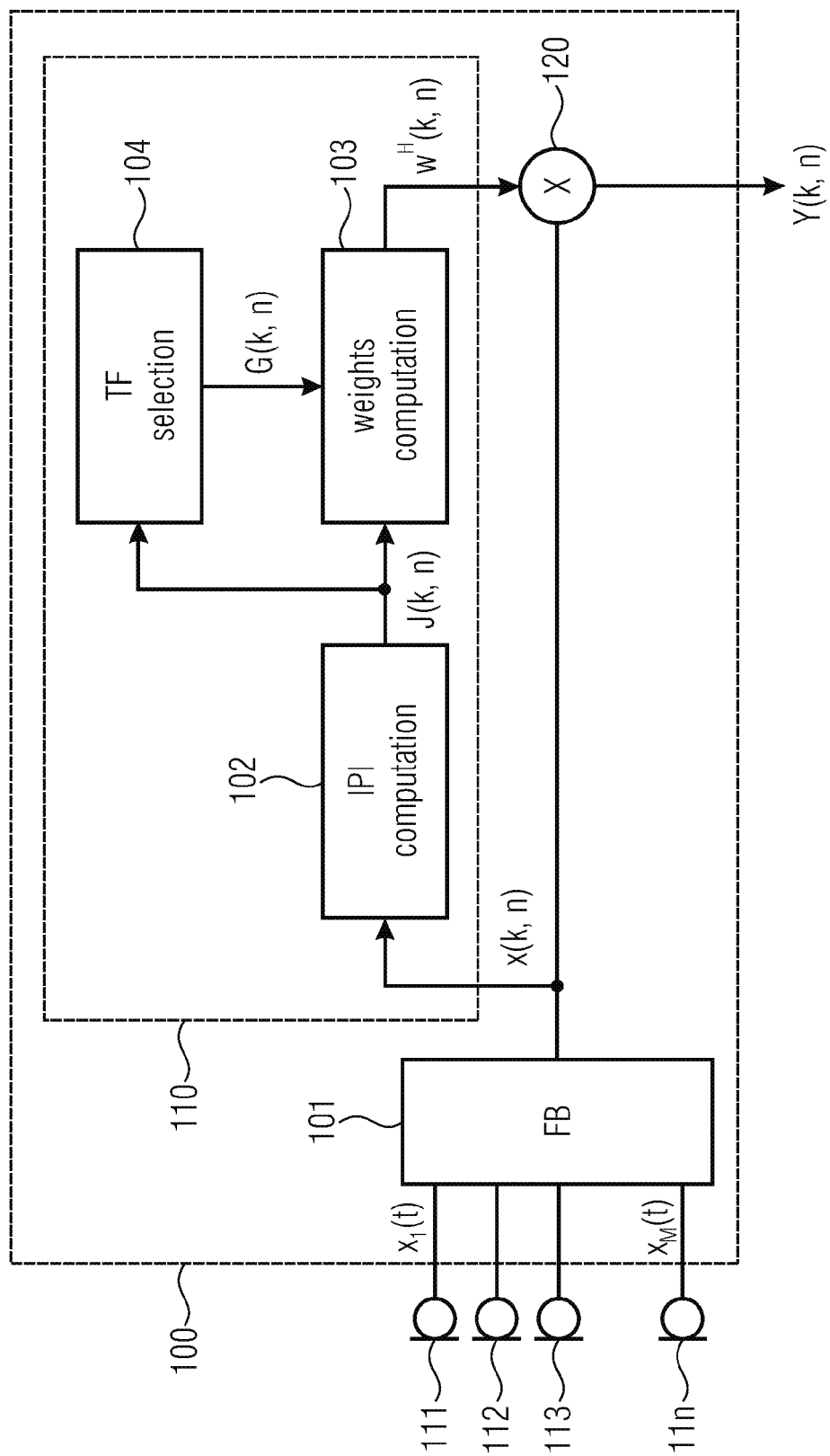
FIG. 2 illustrates a filter according to an embodiment and a plurality of microphones.

FIG. 2 illustrates a filter 100 according to an embodiment and a plurality of microphones 111, 112, 113, . . . , 11n. In the embodiment of FIG. 2, the filter 100 furthermore, comprises a filterbank 101. Moreover, in the embodiment of FIG. 2, the weights generator 110 comprises an information computation module 102, a weights computation module 103 and a transfer function selection module 104.

The processing is carried out in a time-frequency domain with k denoting the frequency index and n denoting the time index, respectively. Input to the apparatus (the filter 100) are M time-domain microphone signals $x_1 \ldots _M(t)$ from the microphones 111, 112, 113, . . . , 11n, which are transformed into a time-frequency domain by the filterbank 101. The transformed microphone signals are given by the vector $$x(k,n)=[X_1(k,n) X_2(k,n) \ldots X_M(k,n)]^T.$$

The filter 100 outputs a desired signal Y(k, n) (the audio output signal). The audio output signal (desired signal) Y(k, n) may, for example, represent an enhanced signal for mono reproduction, a headphone signal for binaural sound reproduction, or a loudspeaker signal for spatial sound reproduction with an arbitrary loudspeaker setup.

The desired signal Y(k, n) is generated by an output signal generator 120, e.g., by conducting a linear combination of the M microphone signals x(k, n) based on instantaneous complex weights $w(k, n) = [W_1(k, n) \ W_2(k, n) \ldots W_M(k, n)]^T$, e.g., by employing the formula $$Y(k,n) = w^H(k,n)x(k,n). \quad (1)$$

The weights $w(k, n)$ are determined by the weights computation module 103. For each k and each n, the weights $w(k, n)$ are newly determined. In other words, for each time-frequency bin (k, n), a determination of the weights $w(k, n)$ is conducted. More specifically, the weights $w(k, n)$ are, e.g., computed based on instantaneous parametric information (IPI) $\mathcal{I}(k, n)$ and based on a corresponding desired transfer function $G(k, n)$.

The information computation module 102 is configured to compute the IPI $\mathcal{I}(k, n)$ from the microphone signals $x(k, n)$. The IPI describes specific characteristics of the signal and noise components comprised in the microphone signals $x(k, n)$ for the given time-frequency instant (k, n).

Figure 3:
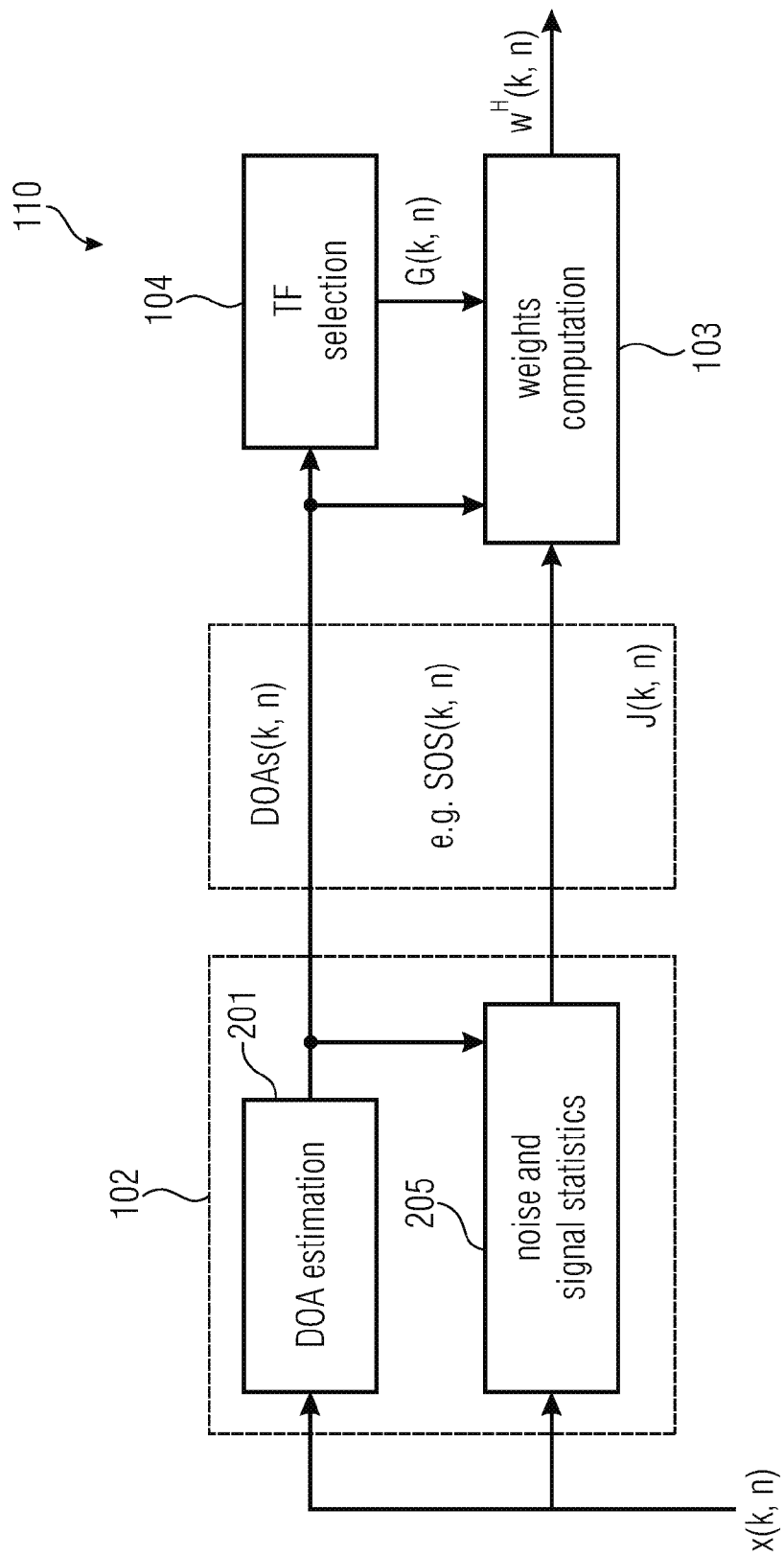
FIG. 3 illustrates a weights generator according to an embodiment.

FIG. 3 illustrates a weights generator 110 according to an embodiment. The weights generator 110 comprises an information computation module 102, a weights computation module 103 and a transfer function selection module 104.

As shown in the example in FIG. 3, the IPI primarily comprises the instantaneous direction-of-arrival (DOA) of one or more directional sound components (e.g., plane waves), for example, computed by a DOA estimation module 201.

As explained below, the DOA information may be represented as an angle (e.g., by [azimuth angle $\varphi(k, n)$, elevation angle $\Theta(k, n)$]), by a spatial frequency (e.g., by $\mu[k|\varphi(k, n)]$), by a phase shift (e.g., by $a[k|\varphi(k, n)]$) by a temporal delay between the microphones, by a propagation vector (e.g., by $a[k|\varphi(k, n)]$), or by an interaural level difference (ILD) or by an interaural time difference (ITD).

Moreover, the IPI $\mathcal{I}(k, n)$ may, e.g., comprise additional information, for example, second-order statistics (SOS) of the signal or noise components.

In an embodiment, the weights generator 110 is adapted to generate the weighting information for each of the plurality of time-frequency bins (k, n) depending on statistical information on signal or noise components of the two or more input microphone signals. Such statistical information is for example, the second-order statistics mentioned here. The statistical information may, for example, be a power of a noise component, a signal-to-diffuse information, a signal-to-noise information, a diffuse-to-noise information, a diffuse-to-noise information, a power of a signal component, a power of a diffuse component, or a power spectral density matrix of a signal component or of a noise component of the two or more input microphone signals.

The second-order statistics may be computed by a statistics computation module 205. This second-order-statistics information may, e.g., comprise the power of a stationary noise component (e.g., self-noise), the power of a non-stationary noise component (e.g., diffuse sound), the signal-to-diffuse ratio (SDR), the signal-to-noise ratio (SNR), or the diffuse-to-noise ratio (DNR). This information allows to compute the optimal weights $w(k, n)$ depending on a specific optimization criteria.

A "stationary noise component"/"slowly-varying noise component" is, e.g., a noise component with statistics that do not change or slowly change with respect to time.

A "non-stationary noise component" is, e.g., a noise component with statistics that quickly change over time.

In an embodiment, the weights generator 110 is adapted to generate the weighting information for each of the plurality of time-frequency bins (k, n) depending on first noise information indicating information on first noise components of the two or more input microphone signals and depending on second noise information indicating information on second noise components of the two or more input microphone signals.

For example, the first noise components may be non-stationary noise components and the first noise information may be information on the non-stationary noise components.

The second noise components may, for example, be stationary noise components/slowly varying noise components and the second noise information may be information on the stationary/slowly-varying noise components In an embodiment, the weights generator 110 is configured to generate the first noise information (e.g. information on the non-stationary/non-slowly varying noise components) by employing, e.g. predefined, statistical information (for example, information on a spatial coherence between two or more input microphone signals resulting from the non-stationary noise components), and wherein weights generator 110 is configured to generate the second noise information (e.g. information on the stationary/slowly varying noise components) without employing statistical information.

Regarding noise components that change fast, the input microphone signals alone do not provide sufficient information to determine information on such noise components. Statistical information is, e.g. additionally, needed to determine information regarding quickly changing noise components.

However, regarding noise components that do not change or change slowly, statistical information is not necessary to determine information on these noise components. Instead, it is sufficient to evaluate the microphone signals.

It should be noted that the statistical information may be computed exploiting the estimated DOA information as shown in FIG. 3. It should further be noted that the IPI can also be provided externally. For example, the DOA of the sound (the position of sound sources, respectively) can be determined by a video camera together with a face recognition algorithm assuming that human talkers form the sound scene.

A transfer function selection module 104 is configured to provide a transfer function $G(k, n)$. The (potentially complex) transfer function $G(k, n)$ of FIG. 2 and FIG. 3 describes the desired response of the system given the (e.g., current parametric) IPI $\mathcal{I}(k, n)$. For example, $G(k, n)$ may describe an arbitrary pick-up pattern of a desired spatial microphone for signal enhancement in mono reproduction, a DOA-dependent loudspeaker gain for loudspeaker reproduction, or an head-related transfer function (HRTF) for binaural reproduction.

It should be noted that usually, the statistics of a recorded sound scene vary rapidly across time and frequency. Consequently, the IPI $\mathcal{I}(k, n)$ and corresponding optimal weights $w(k, n)$ are valid only for a specific time-frequency index and thus are recomputed for each k and n. Therefore, the system can adapt instantaneously to the current recording situation.

It should further be noted that the M input microphones may either form a single microphone array, or they may be distributed to form multiple arrays at different locations. Moreover, the IPI $\mathcal{I}(k, n)$ can comprise position information instead of DOA information, e.g., the positions of the sound sources in a three-dimensional room. By this, spatial filters can be defined that do not only filter specific directions as desired, but three-dimensional spatial regions of the recording scene.

All explanations provided with respect to DOAs are equally applicable when a position information of a sound source is available. For example, the position information may be represented by a DOA (an angle) and a distance. When such a position representation is employed, the DOA can be immediately obtained from the position information. Or, the position information may, for example, be described, by x, y, z coordinates. Then, the DOA can be easily calculated based on the position information of the sound source and based on a position of the microphone which records the respective input microphone signal.

In the following, further embodiments are described.

Some embodiments allow spatially selective sound recording with dereverberation and noise reduction. In this context, embodiments for the application of spatial filtering for signal enhancement in terms of source extraction, dereverberation, and noise reduction are provided. The aim of such embodiments is to compute a signal Y (k, n) that corresponds to the output of a directional microphone with an arbitrary pick-up pattern. This means that directional sound (e.g., a single plane wave) is attenuated or preserved as desired depending on its DOA, while diffuse sound or microphone self-noise is suppressed. According to embodiments, the provided spatial filter combines the benefits of state-of-the-art spatial filters, inter alia, providing a high directivity index (DI) in situations with high DNR, and a high white noise gain (WNG) otherwise. According to some embodiments, the spatial filter may only be linearly constrained, which allows a fast computation of the weights. For example, the transfer function G(k, n) of FIG. 2 and FIG. 3 may, for example, represent a desired pick-up pattern of the directional microphone.

In the following, a formulation of the problem is provided. Then, embodiments of the weights computation module 103 and the IPI computation module 102 for spatially selective sound recording with dereverberation and noise reduction are provided. Moreover, embodiments of a corresponding TF selection module 104 is described.

At first, the problem formulation is provided. An array of M omnidirectional microphones located at $d_{1 \ldots M}$ is considered. For each (k, n) it is assumed that a sound field is composed of L<M plane waves (directional sound) propagating in an isotropic and spatially homogenous diffuse sound field. The microphone signals x(k, n) can be written as $$x(k, n) = \sum_{l=1}^{L} x_l(k, n) + x_d(k, n) + x_n(k, n). \quad (2)$$

where $x_l(k, n)=[X_l(k, n, d_1) \ldots X_l(k, n, d_M)]^T$ a comprises the microphone signals that are proportional to the sound pressure of the l-th plane wave, $x_d(k, n)$ is the measured non-stationary noise (e.g., diffuse sound), and $x_n(k, n)$ is the stationary noise/slowly-varying noise (e.g., microphone self-noise).

Assuming the three components in Formula (2) are mutually uncorrelated, the power spectral density (PSD) matrix of the microphone signals can be described by $$\Phi(k, n) = E\{x(k, n)x^H(k, n)\} \quad (3)$$
$$= \sum_{l=1}^{L} \Phi_l(k, n) + \Phi_d(k, n) + \Phi_n(k, n),$$

with $$\Phi_d(k, n) = \phi_d(k, n)\Gamma_d(k). \quad (4)$$

Here, $\Phi_n(k, n)$ is the PSD matrix of the stationary noise/slowly-varying noise and $\phi_d(k, n)$ is the expected power of the non-stationary noise, which can vary rapidly across time and frequency. The ij-th element of the coherence matrix $\Gamma_d(k)$, denoted by $\gamma_{ij}(k)$, is the coherence between microphone i and j resulting from the non-stationary noise. For example, for a spherically isotropic diffuse field, $\gamma_{ij}(k)$=sin c($\kappa$ $r_{ij}$) [20] with wavenumber $\kappa$ and $r_{ij}$=||dj−d$_i$||. The ij-th element of the coherence matrix $\Gamma_n(k)$ is the coherence between microphone i and j resulting from the stationary noise/slowly-varying noise. For microphone self-noise, $\Phi_n(k, n)=\phi_n(k, n)$ I, where I is an identity matrix and $\phi_n(k, n)$ is the expected power of the self-noise.

The directional sound $x_l(k, n)$ in (2) can be written as $$x_l(k,n)=a[k|\varphi_l(k,n)]X_l(k,n,d_1), \quad (5)$$

where $\varphi_l(k, n)$ is the azimuth of the DOA of the l-th plane wave ($\varphi$=0 denoting the array broadside) and a[k|$\varphi_l$(k, n)]=[a$_1$[k|$\varphi_l$(k, n)] . . . a$_M$[k|$\varphi_l$(k, n)]]$^T$ is the propagation vector. The i-th element of a[k|$\varphi_l$(k, n)], $$a_i[k|\varphi_l(k,n)]=\exp\{\Theta\kappa r_i \sin \varphi_l(k,n)\}, \quad (6)$$

describes the phase shift of the l-th plane wave from the first to the i-th microphone. It should be noted that $r_i$=||di−d1|| is equal to the distance between the first and the i-th microphone.

The angle $\angle a_i[k|\varphi_l(k, n)]=\mu_i[k|\varphi_l(k, n)]$ is often referred to as spatial frequency. The DOA of the l-th wave can be represented by $\varphi_l(k, n)$, $a_i[k|\varphi_l(k, n)]$, a[k|$\varphi_l$(k, n)], or by $\mu_i[k|\varphi_l(k, n)]$ As explained above, the aim of the embodiment is to filter the microphone signals x(k, n) such that directional sounds arriving from specific spatial regions are attenuated or amplified as desired, while the stationary and non-stationary noise is suppressed. The desired signal can therefore be expressed as $$Y(k, n) = \sum_{l=1}^{L} G[k | \varphi_l(k, n)]X_l(k, n, d_1), \quad (7)$$

wherein G[k|$\varphi$(k, n)] is a real-valued or complex-valued arbitrary, e.g. predefined, directivity function which can be frequency dependent.

Figure 4:
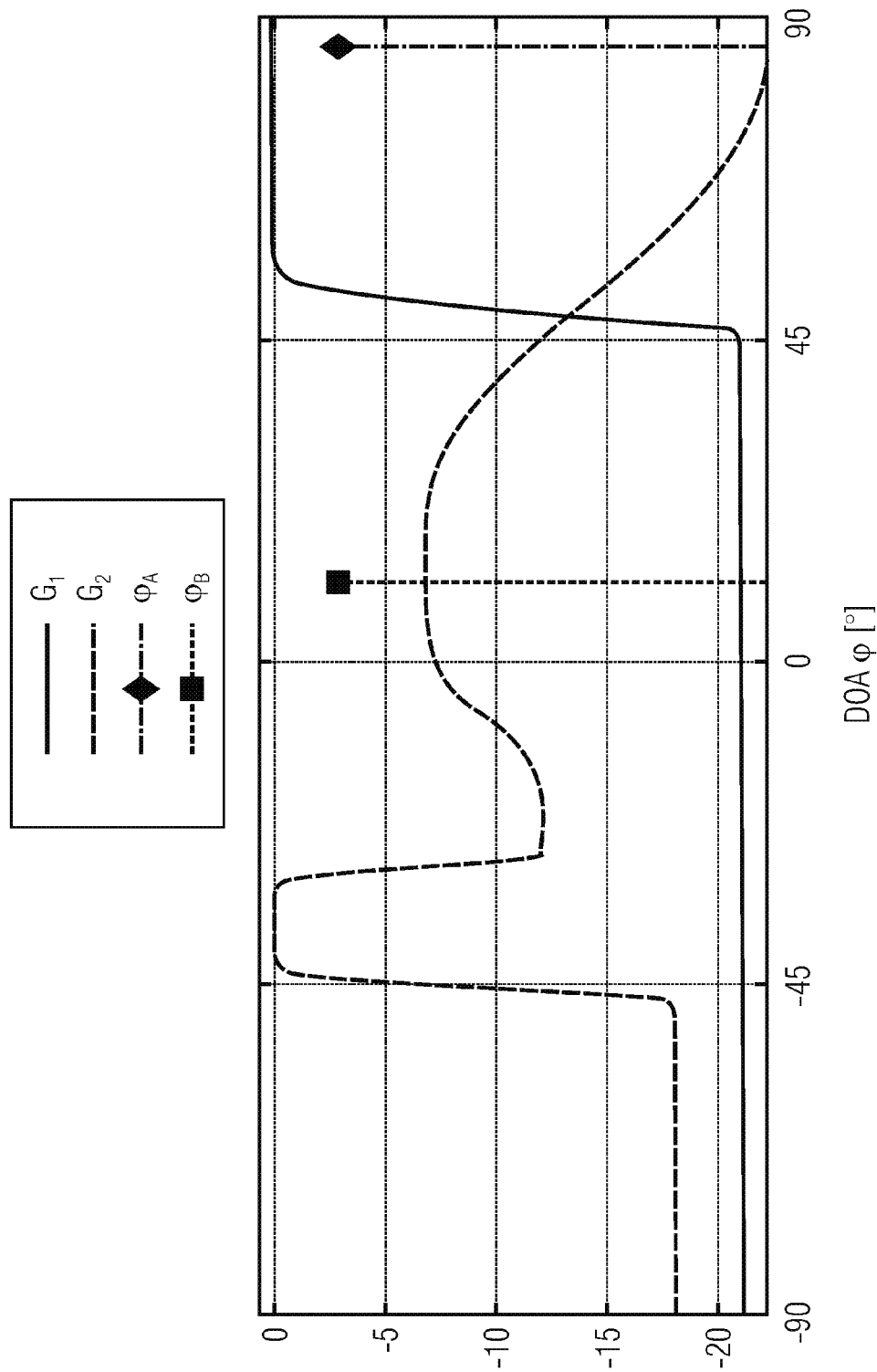
FIG. 4 illustrates a magnitude of two example responses according to an embodiment.

FIG. 4 relates to a scenario with two arbitrary directivity functions and source positions according to an embodiment. In particular, FIG. 4 shows the magnitude of two example directivities $G_1$[k|$\varphi$(k, n)] and $G_2$[k|$\varphi$(k, n)]. When using $G_1$[k|$\varphi$(k, n)] (see the solid line in FIG. 4), directional sound arriving from $\varphi$<45° is attenuated by 21 dB while directional sound from other directions is not attenuated. In principle, arbitrary directivities can be designed, even functions such as $G_2$[k|$\varphi$(k, n)] (see the dashed line in FIG. 4). Moreover, G[k|$\varphi$(k, n)] can be designed time variant, e.g., to extract moving or emerging sound sources once they have been localized.

An estimate of the signal Y(k, n) is obtained by a linear combination of the microphone signals x(k, n) e.g., by $$\hat{Y}(k,n)=w^H(k,n)x(k,n), \quad (8)$$

where w(k, n) is a complex weight vector of length M. The corresponding optimal weight vector w(k, n) is derived in the following. In the following, the dependency of the weights w(k, n) on k and n is omitted for brevity.

Now, two embodiments of the weights computation module 103 in FIG. 2 and FIG. 3 are described.

From (5) and (7), it follows that w(k, n) should satisfy the linear constraints $$w^H(k,n)a[k|\varphi_l(k,n)]=G[k|\varphi_l(k,n)], l\in\{1, 2, \ldots, L\}. \quad (9)$$

Moreover, the non-stationary and the stationary/slowly-varying noise power at the output of the filter should be minimized.

Figure 5:
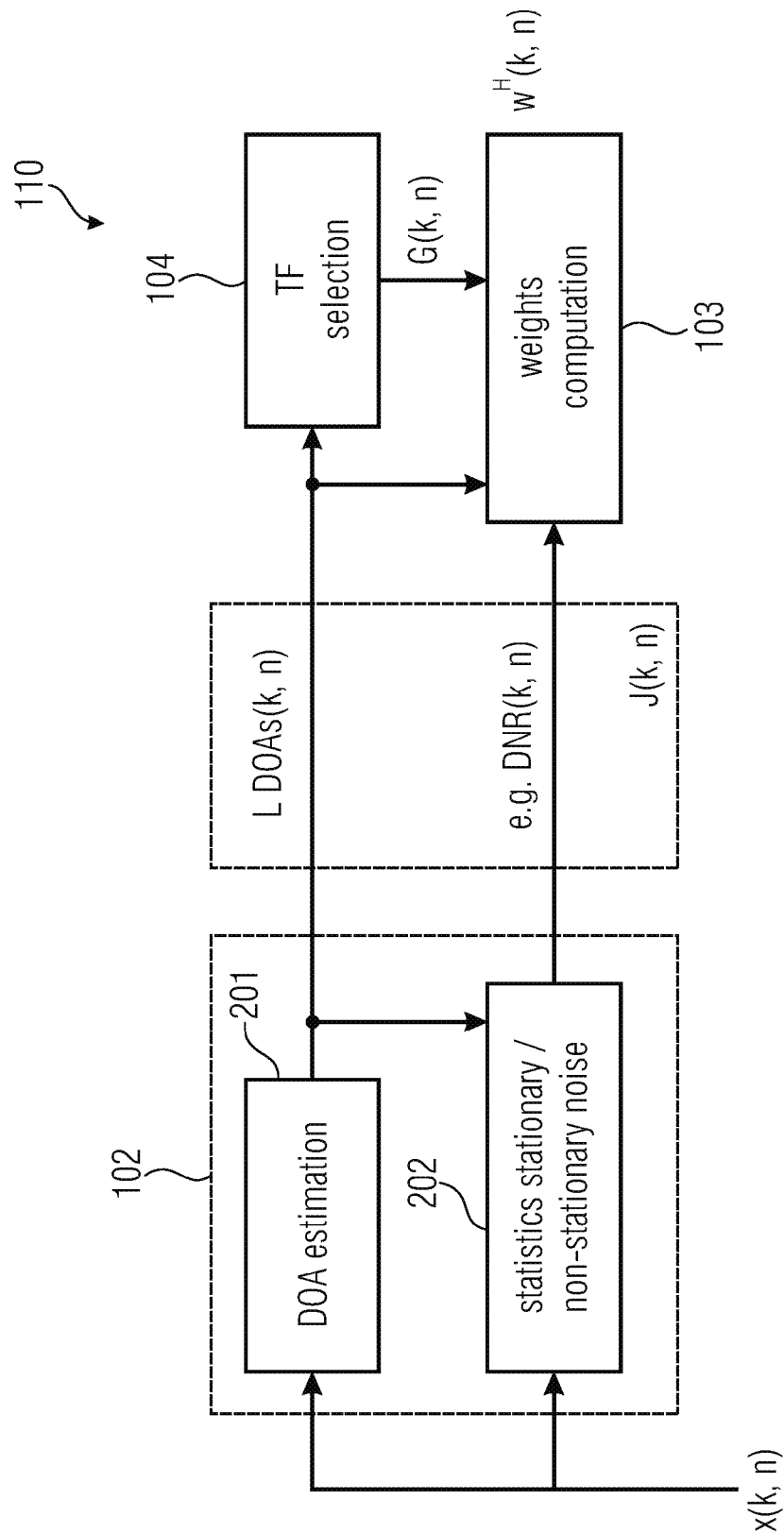
FIG. 5 illustrates a weights generator according to another embodiment implementing a linearly constrained minimum variance approach.

FIG. 5 depicts an embodiment of the invention for the application of spatial filtering. In particular, FIG. 5 illustrates a weights generator 110 according to another embodiment. Again, the weights generator 110 comprises an information computation module 102, a weights computation module 103 and a transfer function selection module 104.

More particularly, FIG. 5 illustrates a linearly constrained minimum variance (LCMV) approach. In this embodiment (see FIG. 5), the weights w(k, n) are computed based on IPI I(k, n) comprising the DOA of L plane waves, and statistics of the stationary and non-stationary noise. The later information may comprise the DNR, the separate powers $\phi_n(k, n)$ and $\phi_d(k, n)$ of the two noise components, or the PSD matrices $\Phi_n$ and $\Phi_d$ of the two noise components.

For example, $\Phi_d$ may be considered as a first noise information on a first noise component of the two noise components and $\Phi_n$ may be considered as a second noise information on a second noise component of the two noise components.

For example, the weights generator 110, may be configured to determine the first noise information $\Phi_d$ depending on one or more coherences between at least some of the first noise components of the one or more microphone input signals. For example, the weights generator 110 may be configured to determine the first noise information depending on a coherence matrix $\Gamma_d(k)$ indicating coherences resulting from the first noise components of the two or more input microphone signals, e.g. by applying the formula $\Phi_d(k, n)=\phi_d(k, n)\Gamma_d(k)$.

The weights w(k, n) to solve the problem in (8) are found by minimizing the sum of the self-noise power (stationary noise/slowly-varying noise) and diffuse sound power (non-stationary noise) at the filter's output, i.e., $$w_{nd} = \underset{w}{\operatorname{argmin}}\, w^H \underbrace{[\Phi_d(k, n) + \Phi_n(k, n)]}_{\Phi_u(k,n)} w \quad (10)$$

$$= \underset{w}{\operatorname{argmin}}\, w^H \underbrace{[\phi_d(k, n)\Gamma_d(k) + \Phi_n(k, n)]}_{\Phi_u(k,n)} w \quad (11)$$

Using (4) and assuming $\Phi_n(k, n)=\phi_n(k, n) I$, the optimization problem can be expressed as $$w_{nd} = \underset{w}{\operatorname{argmin}}\, w^H \underbrace{[\Psi(k, n)\Gamma_d(k) + I]}_{C(k,n)} w \text{ where} \quad (12)$$

$$\Psi(k, n) = \frac{\phi_d(k, n)}{\phi_n(k, n)} \quad (13)$$

is the time-varying input DNR at the microphones. The solution to (10) and (12) given the constraints (9) is [21]

$$w_{nd}=\Phi_u^{-1}A[A^H\Phi_u^{-1}A]^{-1}g \quad (14)$$

$$=C^{-1}A[A^HC^{-1}A]^{-1}g. \quad (15)$$

where $A(k, n)=[a[k|\varphi_1(k, n)] \ldots a[k|\varphi_L(k, n)]]$ comprises the DOA information for the L plane waves in terms of the propagation vectors. The corresponding desired gains are given by $$g(k,n)=[G[k|\varphi_1(k,n)] \ldots G[k|\varphi_L(k,n)]]^T. \quad (16)$$

Embodiments of the estimation of $\Psi(k, n)$ and the other IPI that may be used are described below.

Figure 6:
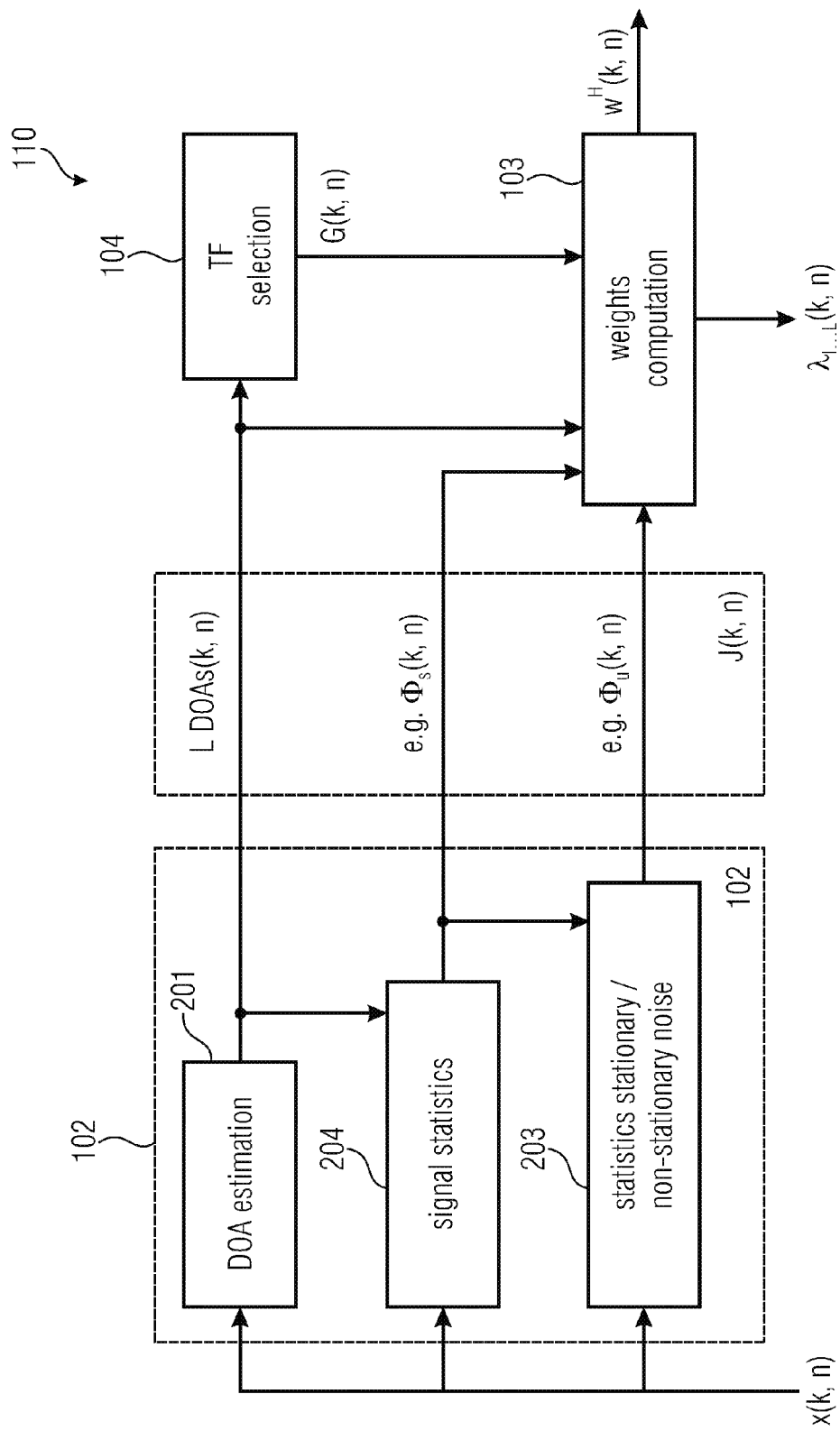
FIG. 6 illustrates a weights generator according to a further embodiment implementing a parametric multichannel Wiener filter approach.

Other embodiments are based on a parametric multichannel Wiener filter. In such embodiments, as illustrated by FIG. 6, the IPI further comprises information on the signal statistics, for instance the signal PSD matrix $\Phi_s(k, n)$ comprising the powers of the L plane waves (directional sound). Moreover, optional control parameters $\lambda_1 \ldots L(k, n)$ are considered to control the amount of signal distortion for each of the L plane waves.

FIG. 6 illustrates an embodiment for the application of spatial filtering implementing a weights generator 110 employing a parametric multichannel Wiener filter. Again, the weights generator 110 comprises an information computation module 102, a weights computation module 103 and a transfer function selection module 104.

The weights w(k, n) are computed via a multichannel Wiener filter approach. The Wiener filter minimizes the power of the residual signal at the output, i.e., $$w_{nd} = \underset{w}{\operatorname{argmin}}\, \underbrace{E\{|\hat{Y}(k, n) - Y(k, n)|^2\}}_{C(k,n)} \quad (17)$$

The cost function C(k, n) to be minimized can be written as $$C(k, n) = E\{|\hat{Y}(k, n) - Y(k, n)|^2\} \quad (18)$$

$$= [g - A^H(k, n)w]^H\Phi_s(k, n)[g - A^H(k, n)w] + w^H\Phi_u(k, n)w. \quad (19)$$

where $\Phi_s(k, n)=E\{x_s(k, n)x_s(k, n)^H\}$ comprises the directional sound PSDs and $x_s(k, n)=[X_1(k, n, d_1) X_2(k, n, d_1) \ldots X_L(k, n, d_1)]$ comprises the signals proportional to the sound pressures of the L plane waves at the reference microphone. Note that $\Phi_s(k, n)$ is a diagonal matrix where the diagonal elements $\text{diag}\{\Phi_s(k, n)\}=[\phi_1(k, n) \ldots \phi_L(k, n)]^T$ are the powers of the arriving plane waves. In order to have control over the introduced signal distortions, one can include a diagonal matrix $\Lambda(k, n)$ comprising time and frequency-dependent control parameters $\text{diag}\{\Lambda\}=[\lambda_1(k, n)\lambda_2(k, n) \ldots \lambda_L(k, n)]^T$, i.e., $$C_{PW}(k, n) = \quad (20)$$
$$[g - A^H(k, n)w]^H\Lambda(k, n)\Phi_s(k, n)[g - A^H(k, n)w] + w^H\Phi_u(k, n)w.$$

The solution to the minimization problem in (17) given $C_{PW}(k, n)$ is $$w=[A^H\Lambda(k,n)\Phi_s(k,n)A+\Phi_u]^{-1}A\Lambda(k,n)\Phi_s(k,n)g. \quad (21)$$

This is identical to $$w=\Phi_u^{-1}A[\Lambda^{-1}\Phi_s^{-1}+A^H\Phi_u^{-1}A]^{-1}g \quad (22)$$

It should be noted that for $\Lambda^{-1}=0$, the LCMV solution in (14) is obtained. For $\Lambda^{-1}=I$, the multichannel Wiener filter is obtained. For other values $\lambda_1 \ldots L(k, n)$, the amount of distortion of the corresponding source signal and the amount of residual noise suppression, can be controlled, respectively. Therefore, one usually defines $\lambda_l^{-1}(k, n)$ depending on the available parametric information, i.e.

$$\lambda_l^{-1}(k,n)=f(\mathcal{J}(k,n)),\tag{23}$$

where $f(\cdot)$ is an arbitrary user-defined function. For example, one can choose $\lambda_{1\ldots L}(k, n)$ according to $$\lambda_l^{-1}(k, n) = \frac{1}{1 + \frac{\phi_l(k, n)}{\phi_u(k, n)}},\tag{24}$$

where $\phi_l(k, n)$ is the power of the l-th signal (l-th plane wave) and $\phi_u(k, n)=\phi_n(k, n)+\phi_d(k, n)$ is the power of the undesired signal (stationary noise/slowly-varying noise plus non-stationary noise). By this, the parametric Wiener filter depends on statistical information on a signal component of the two or more input microphone signals, and thus, the parametric Wiener filter further depends on statistical information on a noise component of the two or more input microphone signals.

If source l is strong compared to the noise, $\lambda_l^{-1}(k, n)$ close to zero is obtained meaning that the LCMV solution is obtained (no distortion of the source signal). If the noise is strong compared to the source power, $\lambda_l^{-1}(k, n)$ close to one is obtained meaning that the multichannel Wiener filter is obtained (strong suppression of the noise).

The estimation of $\Phi_s(k, n)$ and $\Phi_u(k, n)$ is described below.

In the following, embodiments of the instantaneous parameter estimation module 102 are described.

Different IPI needs to be estimated before the weights can be computed. The DOAs of the L plane waves computed in module 201 can be obtained with well-known narrowband DOA estimators such as ESPRIT [22] or root MUSIC [23], or other state-of-the-art estimators. These algorithms can provide for instance the azimuth angle $\varphi(k, n)$, the spatial frequency $\mu[k|\varphi(k, n)]$, the phase shift $a[k|\varphi(k, n)]$, or the propagation vector $a[k|\varphi(k, n)]$ for one or more waves arriving at the array. The DOA estimation will not further be discussed, as DOA estimation itself is well-known in the art.

In the following, diffuse-to-noise ratio (DNR) estimation is described. In particular, the estimation of the input DNR $\Psi(k, n)$, i.e. a realization of module 202 in FIG. 5 is discussed. The DNR estimation exploits the DOA information obtained in module 201. To estimate $\Psi(k, n)$, an additional spatial filter may be used which cancels the L plane waves such that only diffuse sound is captured. The weights of this spatial filter are found, for example, by maximizing the WNG of the array, i.e., $$w_\Psi = \underset{w}{\mathrm{argmin}}\ w^H w \tag{25}$$

subject to $$w^H a[k | \varphi_l(k, n)] = 0, l \in \{1, 2, \ldots, L\},\tag{26}$$

$$w^H a[k | \varphi_0(k, n)] = 1.\tag{27}$$

Constraint (27) ensures non-zero weights $w_\Psi$. The propagation vector $a[k|\varphi_0(k, n)]$ corresponds to a specific direction $\varphi_0(k, n)$ being different from the DOAs $\varphi_l(k, n)$ of the L plane waves. In the following, for $\varphi_0(k, n)$ the direction which has the largest distance to all $\varphi_l(k, n)$ is chosen, i.e., $$\varphi_0(k, n) = \underset{\varphi}{\mathrm{argmax}}\left(\underset{l}{\min}|\varphi - \varphi_l(k, n)|\right),\tag{28}$$

where $\varphi \in \left[-\frac{\pi}{2}, \frac{\pi}{2}\right]$.

Given the weights $w_\Psi$, the output power of the additional spatial filter is given by $$w_\Psi^H \Phi(k,n) w_\Psi = \phi_d(k,n) w_\Psi^H \Gamma_d(k) w_\Psi + \phi_n(k,n) w_\Psi^H w_\Psi.\tag{29}$$

The input DNR can now be computed with (13) and (29), i.e., $$\Psi(k, n) = \frac{w_\Psi^H \Phi(k, n) w_\Psi - \phi_n(k, n) w_\Psi^H w_\Psi}{\phi_n(k, n) w_\Psi^H \Gamma_d(k) w_\Psi}.\tag{30}$$

The expected power, that may be used, of the microphone self-noise $\phi_n(k, n)$ can, for example, be estimated during silence assuming that the power is constant or slowly-varying over time. Note that the proposed DNR estimator does not necessarily provide the lowest estimation variance in practice due to the chosen optimization criteria (45), but provides unbiased results.

In the following, the estimation of the non-stationary PSD $\phi_d(k, n)$, i.e., another realization of module (202) in FIG. 5 is discussed. The power (PSD) of the non-stationary noise can be estimated with $$\phi_d(k, n) - \frac{w_\Psi^H [\Phi(k, n) - \Phi_n(k, n)] w_\Psi}{w_\Psi^H \Gamma_d(k) w_\Psi},\tag{31}$$

where $w_\Psi$ is defined in the previous paragraph. It should be noted that the stationary/slowly-varying noise PSD matrix $\Phi_n(k, n)$ can be estimated during silence (i.e., during the absence of the signal and non-stationary noise), i.e., $$\Phi_n(k,n)=E\{x(k,n)x^H(k,n)\},\tag{32}$$

where the expectation is approximated by averaging over silent frames n. Silent frames can be detected with state-of-the-art methods.

In the following, estimation of the undesired signal PSD matrix (see module 203) is discussed.

The PSD matrix of the undesired signal (stationary/slowly-varying noise plus non-stationary noise) $\Phi_u(k, n)$ can be obtained with $$\Phi_u(k,n)=\phi_n(k,n)(\Psi(k,n)\Gamma_d(k)+\Gamma_n(k)),\tag{33}$$

or more general with $$\Phi_u(k,n)=\phi_d(k,n)\Gamma_d(k)+\Phi_n(k,n),\tag{34}$$

where $\Gamma_d(k)$ and $\Gamma_n(k)$ are available as a priori information (see above). The DNR $\Psi(k, n)$, stationary/slowly-varying noise power $\phi_n(k, n)$, and other quantities that may be used can be computed as explained above. Therefore, the $\Phi_u(k, n)$ estimation exploits the DOA information obtained by module 201.

In the following, estimation of the signal PSD matrix (see module 204) is described.

The power $\phi_{1\ldots L}(k, n)$ of the arriving plane waves, that may be used to compute $\Phi_s(k, n)$, can be computed with $$\begin{bmatrix} \phi_1(k,n) \\ \vdots \\ \phi_L(k,n) \end{bmatrix} = \begin{bmatrix} w_1(k,n) \\ \vdots \\ w_L(k,n) \end{bmatrix}^H [\Phi_x(k,n) - \Phi_u(k,n)] \begin{bmatrix} w_1(k,n) \\ \vdots \\ w_L(k,n) \end{bmatrix}, \quad (35)$$

where the weights $w_l$ suppress all arriving plane waves but the l-th wave, i.e., $$w_l(k,n)^H a_{l'}(k,n) = \begin{cases} 1 & \text{if } l = l' \\ 0 & \text{otherwise} \end{cases}. \quad (36)$$

For example, $$w_l = \underset{w}{\text{argmin}} \; w^H w \quad (37)$$

subject to (36). The $\Phi_s(k, n)$ estimation exploits the DOA information obtained in module (201). The PSD matrix, that may be used, of the undesired signals $\Phi_u(k, n)$ can be computed as explained in the previous paragraph.

Now, a transfer function selection module 104 according to an embodiment is described.

In this application, the gain $G[k|\varphi_l(k, n)]$ may be found for the corresponding plane wave l depending on the DOA information $\varphi_l(k, n)$. The transfer function $G[k|\varphi(k, n)]$ for the different DOAs $\varphi(k, n)$ is available to the system e.g. as user-defined a priori information. The gain can also be computed based on the analysis of an image, for instance using the positions of detected faces. Two examples are depicted in FIG. 4. These transfer functions correspond to the desired pick-up patterns of the directional microphone. The transfer function $G[k|\varphi(k, n)]$ can be provided e.g. as a look-up table, i.e., for an estimated $\varphi_l(k, n)$ we select the corresponding gain $G[k|\varphi_l(k, n)]$ from the look-up table. Note that the transfer function can also be defined as a function of the spatial frequency $\mu[k|\varphi(k, n)]$ instead of the azimuth $\varphi_l(k, n)$, i.e., $G(k, \mu)$ instead of $G[k|\varphi(k, n)]$. The gains can also be computed based on source position information instead of DOA information.

Now, experimental results are provided. The following simulation results demonstrate the practical applicability of the above-described embodiments. The proposed system to state-of-the-art systems are compared, which will be explained below. Then, the experimental setup is discussed and results are provided.

At first, existing spatial filters are considered.

While the PSD $\phi_n(k, n)$ can be estimated during periods of silence, $\phi_d(k, n)$ is commonly assumed unknown and unobservable. Therefore two existing spatial filters are considered that can be computed without this knowledge.

The first spatial filter is known as a delay-and-sum beamformer and minimizes the self-noise power at the filter's output [i.e., maximizes the WNG] [1]. The optimal weight vector that minimizes the mean squared error (MSE) between (7) and (8) subject to (9) is then obtained by $$w_n = \underset{w}{\text{argmin}} \; \frac{w^H \Phi_n(k,n) w}{w^H w} \quad (38)$$

There exists a closed-form solution to (38) [1] that allows a fast computation of $w_n$. It should be noted that this filter does not necessarily provide the largest DI.

The second spatial filter is known as the robust superdirective (SD) beamformer and minimizes the diffuse sound power at the filter's output [i.e., maximizes the DI] with a lower-bound on the WNG [24]. The lower-bound on the WNG increases the robustness to errors in the propagation vector and limits the amplification of the self-noise [24]. The optimal weight vector that minimizes the MSE between (7) and (8) subject to (9) and satisfies the lower-bound on the WNG is then obtained by $$w_d = \underset{w}{\text{argmin}} \; \frac{w^H \Phi_d(k,n) w}{w^H \Gamma_d(k,n) w} \quad (39)$$

and subject to a quadratic constraint $w^H w < \beta$. The parameter $\beta^{-1}$ defines the minimum WNG and determines the achievable DI of the filter. In practice, it is often difficult to find an optimal trade-off between a sufficient WNG in low SNR situations, and a sufficiently high DI in high SNR situations. Moreover, solving (39) leads to a non-convex optimization problem due to the quadratic constraint, which is time-consuming to solve. This is especially problematic, since the complex weight vector need to be recomputed for each k and n due to the time-varying constraints (9).

Now, an experimental setup is considered. Assuming L=2 plane waves in the model in (2) and a uniform linear array (ULA) with M=4 microphones with an inter-microphone spacing of 3 cm, a shoebox room (7.0×5.4×2.4 m³, $RT_{60} \approx 380$ ms) was simulated using the source-image method [25, 26] with two speech sources at $\varphi_A = 86°$ and $\varphi_B = 11°$, respectively (distance 1.75 m, cf. FIG. 4). The signals consisted of 0.6 s silence followed by double talk. White Gaussian noise was added to the microphone signals resulting in a segmental signal-to-noise ratio (SSNR) of 26 dB. The sound was sampled at 16 kHz and transformed into the time-frequency domain using a 512-point STFT with 50% overlap.

The directivity function $G_1(\varphi)$ of FIG. 4 is considered, i.e., source A shall be extracted without distortion while attenuating the power of source B by 21 dB. The two spatial filters above and the provided spatial filter is considered. For the robust SD beamformer (39), the minimum WNG is set to −12 dB. For the provided spatial filter (12), the DNR $\Psi(k, n)$ is estimated as explained above. The self-noise power $\phi_n(k, n)$ is computed from the silent signal part at the beginning. The expectation in (3) is approximated by a recursive temporal average over $\tau = 50$ ms.

In the following, time-invariant directional constraints are considered.

For this simulation, prior knowledge about the two source positions $\varphi_A$ and $\varphi_B$ is assumed. In all processing steps we used $\varphi_1(k, n) = \varphi_A$ and $\varphi_2(k, n) = \varphi_B$. Therefore, the directional constraints in (9) and (26) do not vary over time.

Figure 7A:
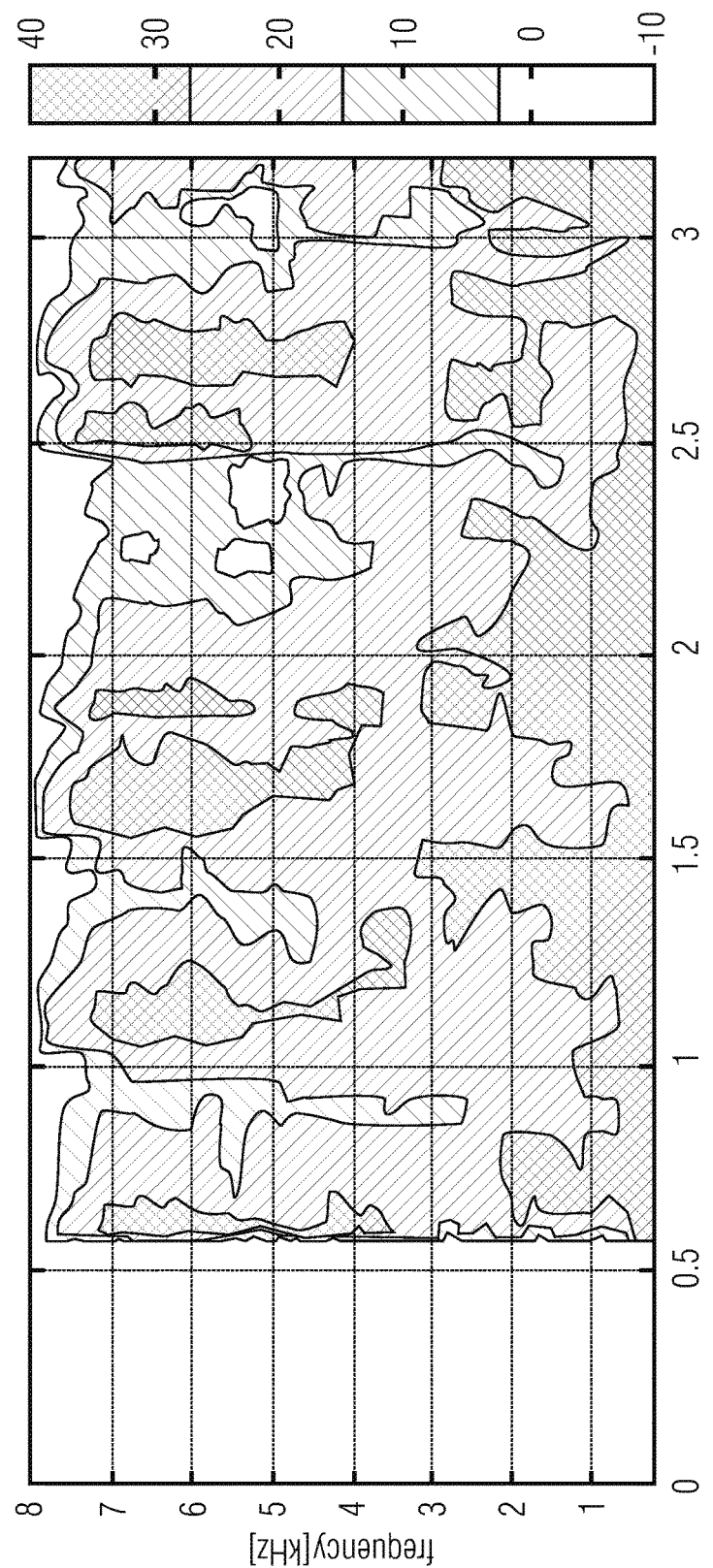
FIGS. 7A, 7B illustrate a true and estimated diffuse-to-noise ratio as a function of time and frequency.
Figure 7B:
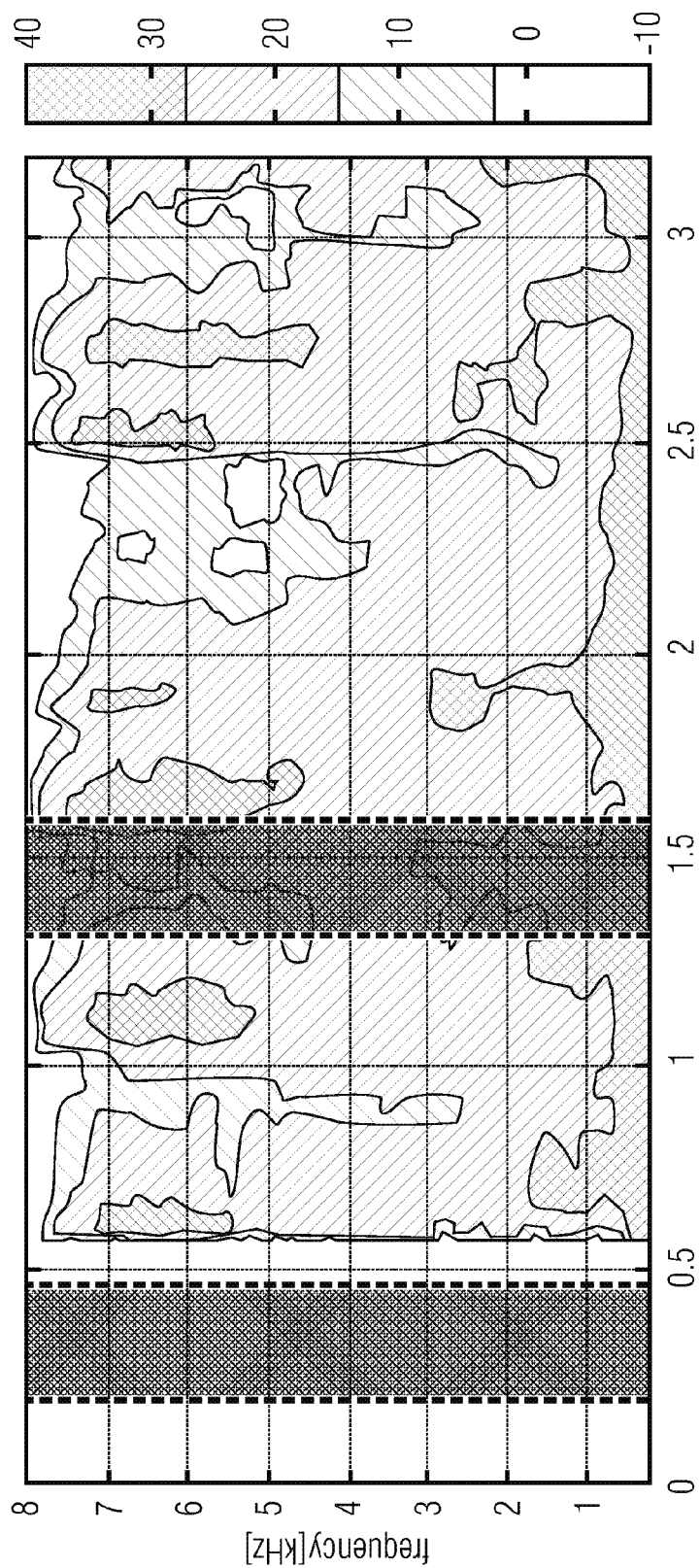

FIG. 7 illustrates true and estimated DNR $\Psi(k, n)$. The two marked areas indicate respectively a silent and active part of the signal. In particular, FIG. 7 depicts the true and estimated DNR $\Psi(k, n)$ as a function of time and frequency. We obtain a relatively high DNR during speech activity due to the reverberant environment. The estimated DNR in FIG. 7(*b*) possesses a limited temporal resolution due to the incorporated temporal averaging process. Nevertheless, the $\Psi(k, n)$ estimates are sufficiently accurate as shown by the following results.

Figure 8A:
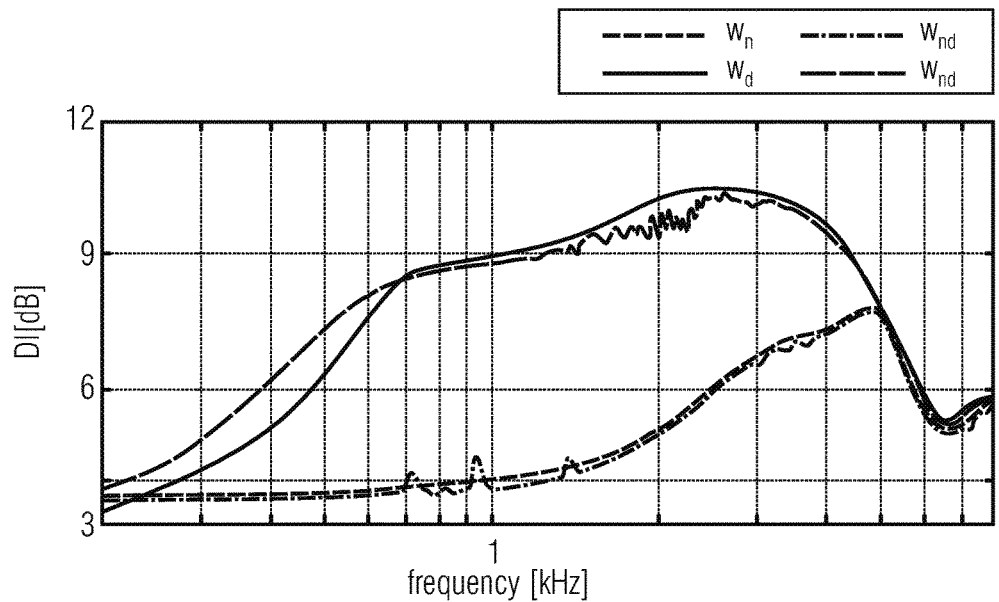
FIGS. 8A, 8B illustrate the directivity index and the white noise gain of compared spatial filters.
Figure 8B:
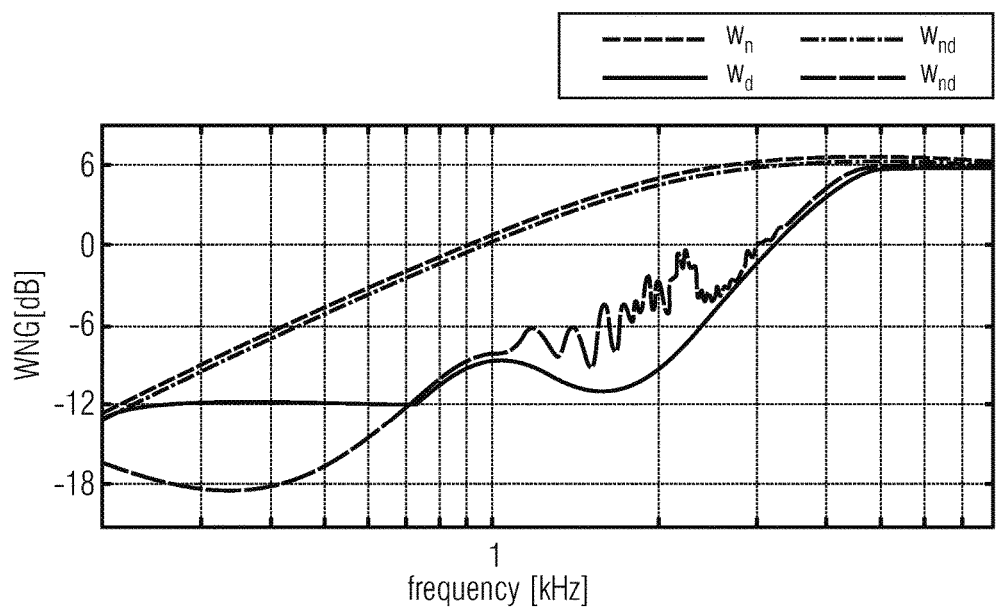

FIG. 8(a) depicts the mean DI for $w_n$ and $w_d$ (which are both signal-independent), and for the proposed spatial filter $w_{nd}$ (which is signal-dependent). For the proposed spatial filter, we show the DI for a silent part of the signal and during speech activity [both signal parts marked in FIG. 7(b)]. During silence, the proposed spatial filter (dashed line $w_{nd}$) provides the same low DI as $w_n$. During speech activity (solid line $w_{nd}$), the obtained DI is as high as for the robust SD beamformer ($w_d$). FIG. 8(b) shows the corresponding WNGs. During silence, the proposed spatial filter (dashed line $w_{nd}$) achieves a high WNG, while during signal activity, the WNG is relatively low.

FIG. 8: DI and WNG of the compared spatial filters. For $w_d$, the minimum WNG was set to −12 dB to make the spatial filter robust against the microphone self-noise.

In general, FIG. 8 shows that the proposed spatial filter combines the advantages of both existing spatial filters: during silent parts, a maximum WNG is provided leading to a minimal self-noise amplification, i.e., high robustness.

During signal activity and high reverberation, where the self-noise is usually masked, a high DI is provided (at cost of a low WNG) leading to an optimal reduction of the diffuse sound. In this case, even rather small WNGs are tolerable.

Note that for higher frequencies (f>5 kHz), all spatial filters perform nearly identically since the coherence matrix $\Gamma_d(k)$ in (39) and (12) is approximately equal to an identity matrix.

In the following, instantaneous directional constraints are considered.

For this simulation, it is assumed that no a priori information on $\varphi_A$ and $\varphi_B$ is available. The DOAs $\varphi_1(k, n)$ and $\varphi_2(k, n)$ are estimated with ESPRIT. Thus, the constraints (9) vary across time. Only for the robust SD beamformer ($w_d$) a single and time-invariant constraint (9) corresponding to a fixed look direction of $\varphi_A=86°$ is employed. This beamformer serves as a reference.

Figure 9A:
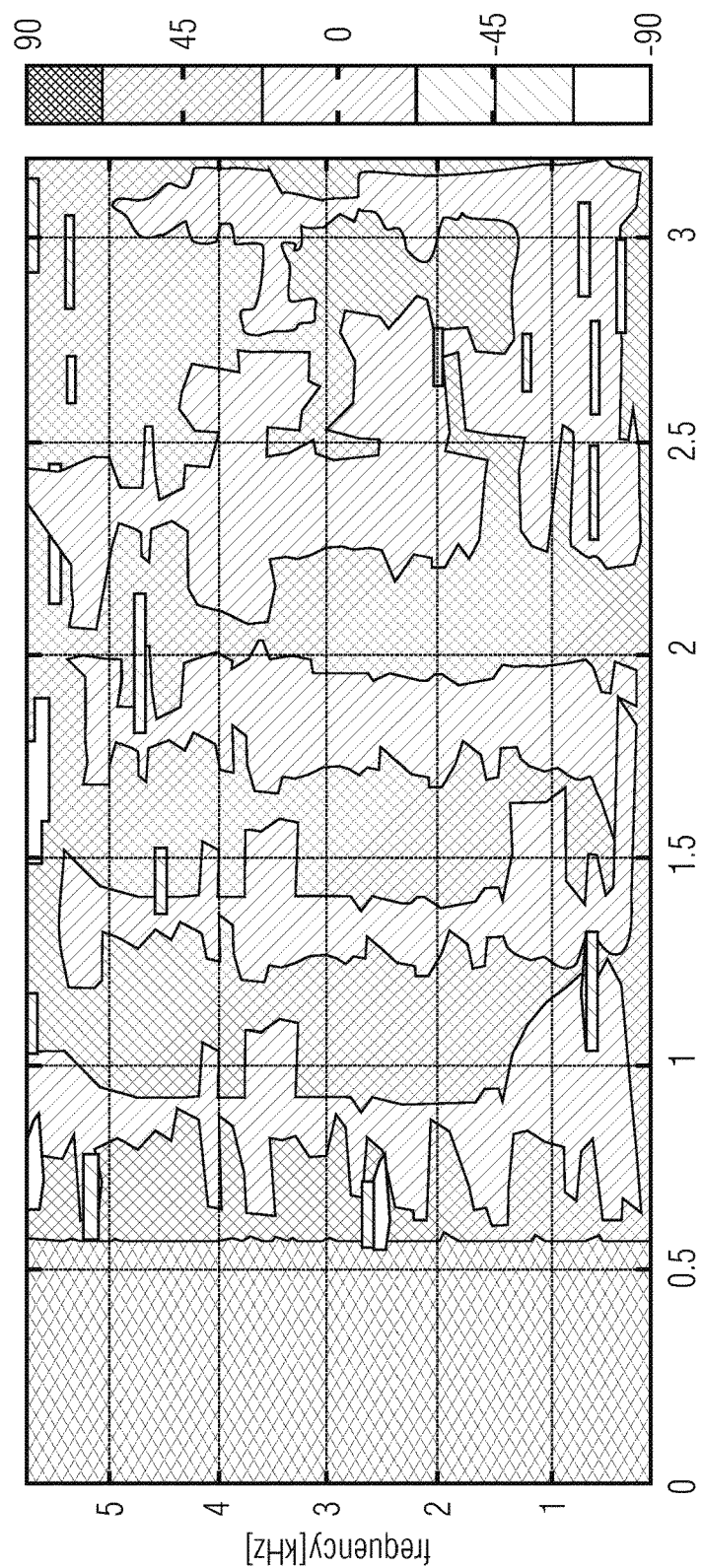
FIGS. 9A, 9B illustrate an estimated direction of arrival and a resulting gain.
Figure 9B:
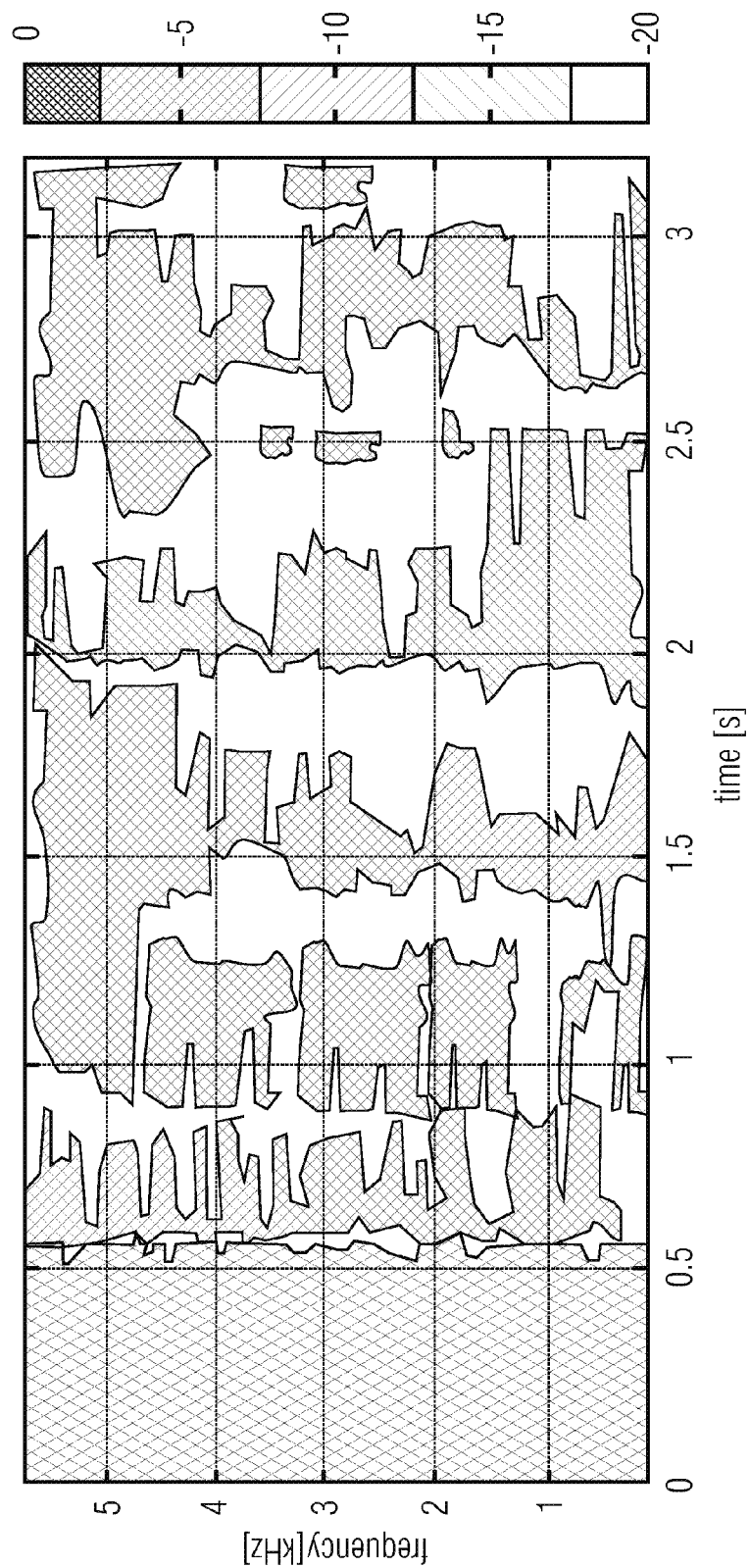

FIG. 9 depicts estimated DOA $\varphi_1(k, n)$ and resulting gains $G[k|\varphi_1(k, n)]$. In particular, FIG. 9 illustrates the estimated DOA $\varphi_1(k, n)$ and resulting gain $|G[k|\varphi_1(k, n)]|^2$. The arriving plane wave is not attenuated if the DOA is inside the spatial window in FIG. 4 (solid line). Otherwise, the power of the wave is attenuated by 21 dB.

Table 1 illustrates a performance of all spatial filters [* unprocessed]. Values in brackets refer to time-invariant directional constraints, values not in brackets refer to instantaneous directional constraints. The signals were A-weighted before computing the SIR, SRR, and SSNR.

TABLE 1

|  | SIR [dB] | SRR [dB] | SSNR [dB] | PESQ |
| --- | --- | --- | --- | --- |
| * | 11 (11) | −7 (−7) | 26 (26) | 1.5 (1.5) |
| $w_n$ | 21 (32) | −2 (−3) | 33 (31) | 2.0 (1.7) |
| $w_d$ | 26 (35) | 0 (−1) | 22 (24) | 2.1 (2.0) |
| $w_{nd}$ | 25 (35) | 1 (−1) | 28 (26) | 2.1 (2.0) |

In particular, Table 1 summarizes the overall performance of the spatial filters in terms of signal-to-interference ratio (SIR), signal-to-reverberation ratio (SRR), and SSNR at the filter's output. In terms of SIR and SRR (source separation, dereverberation), the proposed approach ($w_{nd}$) and the robust SD beamformer ($w_d$) provide the highest performance. However, the SSNR of the proposed $w_{nd}$ is 6 dB higher than the SSNR of $w_d$, which represented a clearly audible benefit. The best performance in terms of SSNR is obtained using $w_n$. In terms of PESQ, $w_{nd}$ and $w_d$ outperform $w_n$. Using instantaneous directional constraints instead of time-invariant constrains (values in brackets) mainly reduced the achievable SIR, but provides a fast adaption in case of varying source positions. It should be noted that the computation time of all complex weights that may be used per time frame was larger than 80 s for $w_d$ (CVX toolbox[27, 28]) and smaller than 0.08 s for the proposed approach (MATLAB R2012b, MacBook Pro 2008).

In the following, embodiments for spatial sound reproduction are described. The aim of the embodiments is to capture a sound scene e.g. with a microphone array and to reproduce the spatial sound with an arbitrary sound reproduction system (e.g., 5.1 loudspeaker setup, headphone reproduction) such that the original spatial impression is recreated. We assume that the sound reproduction system comprises N channels, i.e., we compute N output signals Y (k, n).

At first a problem formulation is provided. The signal model (see Formula (2) above) is considered and a similar problem is formulated. The stationary/slowly-varying noise corresponds to undesired microphone self-noise while the non-stationary noise corresponds to desired diffuse sound. The diffuse sound is desired in this application as it is of major importance to reproduce the original spatial impression of the recording scene.

In the following, reproducing the directional sound $X_l(k, n, d_1)$ without distortions from the corresponding DOA $\varphi_l(k, n)$ shall be achieved. Moreover, the diffuse sound shall be reproduced with correct energy from all directions, while the microphone self-noise is suppressed. Therefore, the desired signal Y (k, n) in (7) is now expressed as $$Y_i(k, n) = \sum_{l=1}^{L} G_i[k \mid \varphi_l(k, n)] X_l(k, n, d_1) + G_d(k, n) X_{d,i}(k, n, d), \qquad (40)$$

where $Y_i(k, n)$ is the signal of the i-th channel of the sound reproduction system (i={1, . . . , N}), $X_{d,i}(k, n, d)$ is the measured diffuse sound at an arbitrary point (for instance at the first microphone $d_1$) to be reproduced from loudspeaker i, and $G_d(k, n)$ is a gain function for the diffuse sound to ensure a correct power of the diffuse sound during reproduction (usually $G_d(k, n)=1/\sqrt{N}$). Ideally, the signals $X_{d,i}(k, n)$ have the correct diffuse sound power and are mutually uncorrelated across the channels i, i.e., $$E\{X_{d,i}(k, n) X_{d,j}^*(k, n)\} = \begin{cases} \phi_d(k, n) & \text{if } i = j \\ 0 & \text{otherwise} \end{cases}. \qquad (41)$$

Figure 10:
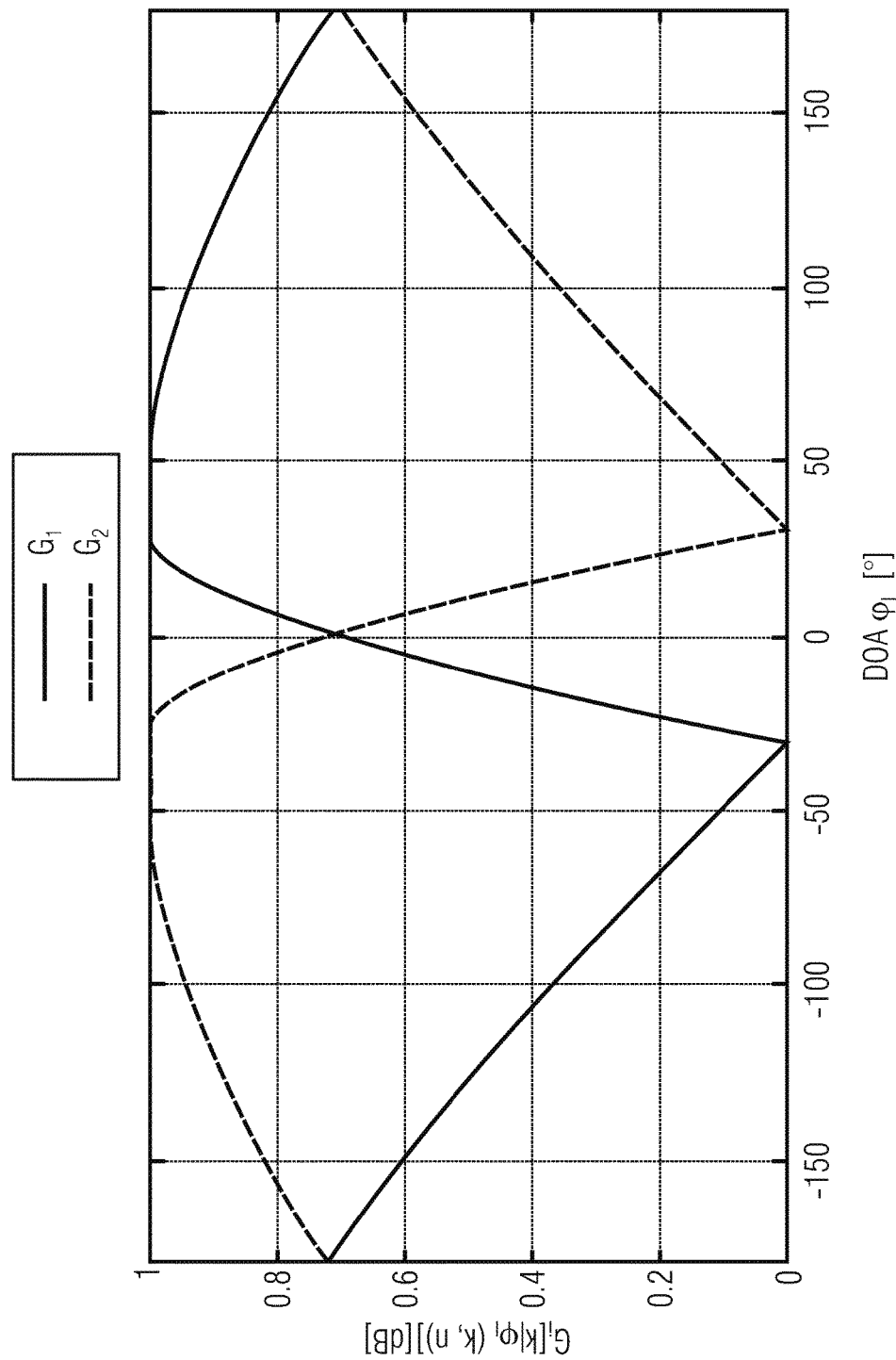
FIG. 10 illustrates an example for the case of stereo loudspeaker reproduction.

The transfer functions $G_i[k|\varphi_l(k, n)]$ for the directional sound components correspond to a DOA-dependent loudspeaker gain function. An example for the case of stereo loudspeaker reproduction is depicted in FIG. 10. If wave 1 arrives from $\varphi_l(k, n)=30°$, $G_1=1$ and $G_2=0$. This means, this directional sound is reproduced only from channel i=1 of the reproduction system (left channel). For $\varphi_l(k, n)=0°$, we have $G_1=G_2=\sqrt{0.5}$, i.e., the directional sound is reproduced with equal power from both loudspeakers. Alternatively, $Gi[k|\varphi_l(k, n)]$ may correspond to an HRTF if a binaural reproduction is desired.

The signals $Y_i(k, n)$ are estimated via a linear combination of the microphone signals based on complex weights w(k, n), as explained above, i.e., $$\hat{Y}_i(k,n) = w_i^H(k,n) x(k,n), \qquad (42)$$

subject to specific constraints. The constraints and computation of the weights $w_i(k, n)$ are explained in the next subsection.

In the following, the weights computation module 103 according to corresponding embodiments is considered. in this context, two embodiments of the weights computation module 103 of FIG. 2 are provided. It follows from Formula (5) and Formula (40) that $w_i(k, n)$ should satisfy the linear constraints $$w_i^H(k,n)a[k|\varphi_l(k,n)]=G_i[k|\varphi_l(k,n)], l \in \{1, 2, \ldots, L\},$$
$$i \in \{1, 2, \ldots, N\}. \qquad (43)$$

Moreover, the diffuse sound power should be be maintained. Therefore, $w_i(k, n)$ may satisfy the quadratic constraint $$w_i^H \Gamma_d(k,n) w_i = |G_d(k,n)|^2, \forall i. \qquad (44)$$

Moreover, the self-noise power at the filter's output should be minimized. Thus, the optimal weights may be computed as $$w_i = \underset{w}{\arg\min} \; w^H w \qquad (45)$$

subject to Formula (43) and Formula (44). This leads to a convex optimization problem which can be solved e.g. with well-known numerical methods [29].

With respect to the instantaneous parameter estimation module 102, according to corresponding embodiments, the DOAs $\varphi_l(k, n)$ of the L plane waves can be obtained with well-known narrowband DOA estimators such as ESPRIT [22] or root MUSIC [23], or other state-of-the-art estimators.

Now, the transfer function selection module 104 according to corresponding embodiments is considered. In this application, the gain $G_i[k|\varphi_l(k, n)]$ for channel i is found for the corresponding directional sound l depending on the DOA information $\varphi_l(k, n)$. The transfer function $G_i[k|\varphi(k, n)]$ for the different DOAs $\varphi(k, n)$ and channels i is available to the system e.g. as user-defined a priori information. The gains can also be computed based on the analysis of an image, for instance using the positions of detected faces.

The transfer functions $G_i[k|\varphi(k, n)]$ are usually provided as a look-up table, i.e., for an estimated $\varphi_l(k, n)$ we select the corresponding gains $G_i[k|\varphi_l(k, n)]$ from the look-up table. Note that the transfer function can also be defined as a function of the spatial frequency $\mu[k|\varphi(k, n)]$ instead of the azimuth $\varphi_l(k, n)$, i.e., $G_i(k, \mu)$ instead of $G_i[k|\varphi(k, n)]$. Note further that the transfer function can also correspond to an HRTF which enables a binaural sound reproduction. In this case, $G_i[k|\varphi(k, n)]$ is usually complex. Note that the gains or transfer functions can also be computed based on source position information instead of DOA information.

An example for stereo loudspeaker reproduction is depicted in FIG. 10. In particular, FIG. 10 illustrates gain functions for stereo reproduction.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] J. Benesty, J. Chen, and Y. Huang, *Microphone Array Signal Processing*. Berlin, Germany: Springer-Verlag, 2008.

[2] S. Doclo, S. Gannot, M. Moonen, and A. Spriet, "Acoustic beamforming for hearing aid applications," in *Handbook on Array Processing and Sensor Networks*, S. Haykin and K. Ray Liu, Eds. Wiley, 2008, ch. 9.

[3] S. Gannot and I. Cohen, "Adaptive beamforming and postfiltering," in *Springer Handbook of Speech Processing*, J. Benesty, M. M. Sondhi, and Y. Huang, Eds. Springer-Verlag, 2008, ch. 47.

[4] J. Benesty, J. Chen, and E. A. P. Habets, *Speech Enhancement in the STFT Domain*, ser. SpringerBriefs in Electrical and Computer Engineering. Springer-Verlag, 2011.

[5] I. Tashev, M. Seltzer, and A. Acero, "Microphone array for headset with spatial noise suppressor," in *Proc. Ninth International Workshop on Acoustic, Echo and Noise Control (IWAENC)*, Eindhoven, The Netherlands, 2005.

[6] M. Kallinger, G. Del Galdo, F. Kuech, D. Mahne, and R. Schultz-Amling, "Spatial filtering using directional audio coding parameters," in *Proc. IEEE Intl. Conf. on Acoustics, Speech and Signal Processing (ICASSP)*, April 2009, pp. 217-220.

[7] M. Kallinger, G. D. Galdo, F. Kuech, and O. Thiergart, "Dereverberation in the spatial audio coding domain," in *Audio Engineering Society Convention* 130, London UK, May 2011.

[8] G. Del Galdo, O. Thiergart, T. Weller, and E. A. P. Habets, "Generating virtual microphone signals using geometrical information gathered by distributed arrays," in *Proc. Hands-Free Speech Communication and Microphone Arrays (HSCMA)*, Edinburgh, United Kingdom, May 2011.

[9] S. Nordholm, I. Claesson, and B. Bengtsson, "Adaptive array noise suppression of handsfree speaker input in cars," *IEEE Trans. Veh. Technol.*, vol. 42, no. 4, pp. 514-518, November 1993.

[10] O. Hoshuyama, A. Sugiyama, and A. Hirano, "A robust adaptive beamformer for microphone arrays with a blocking matrix using constrained adaptive filters," *IEEE Trans. Signal Process.*, vol. 47, no. 10, pp. 2677-2684, October 1999.

[11] S. Gannot, D. Burshtein, and E. Weinstein, "Signal enhancement using beamforming and nonstationarity with applications to speech," *IEEE Trans. Signal Process.*, vol. 49, no. 8, pp. 1614-1626, August 2001.

[12] W. Herbordt and W. Kellermann, "Adaptive beamforming for audio signal acquisition," in *Adaptive Signal Processing: Applications to real-world problems*, ser. Signals and Communication Technology, J. Benesty and Y. Huang, Eds. Berlin, Germany: Springer-Verlag, 2003, ch. 6, pp. 155-194.

[13] R. Talmon, I. Cohen, and S. Gannot, "Convolutive transfer function generalized sidelobe canceler," *IEEE Trans. Audio, Speech, Lang. Process.*, vol. 17, no. 7, pp. 1420-1434, September 2009.

[14] A. Krueger, E. Warsitz, and R. Haeb-Umbach, "Speech enhancement with a GSC-like structure employing eigenvector-based transfer function ratios estimation," *IEEE Trans. Audio, Speech, Lang. Process.*, vol. 19, no. 1, pp. 206-219, January 2011.

[15] E. A. P. Habets and J. Benesty, "Joint dereverberation and noise reduction using a two-stage beamforming approach," in *Proc. Hands-Free Speech Communication and Microphone Arrays (HSCMA)*, 2011, pp. 191-195.

[16] M. Taseska and E. A. P. Habets, "MMSE-based blind source extraction in diffuse noise fields using a complex coherence-based a priori SAP estimator," in *Proc. Intl. Workshop Acoust. Signal Enhancement (IWAENC)*, September 2012.

[17] G. Reuven, S. Gannot, and I. Cohen, "Dual source transfer-function generalized sidelobe canceller," *IEEE Trans. Speech Audio Process.*, vol. 16, no. 4, pp. 711-727, May 2008.

[18] S. Markovich, S. Gannot, and I. Cohen, "Multichannel eigenspace beamforming in a reverberant noisy environment with multiple interfering speech signals," *IEEE Trans. Audio, Speech, Lang. Process.*, vol. 17, no. 6, pp. 1071-1086, August 2009.

[19] O. Thiergart and E. A. P. Habets, "Sound field model violations in parametric spatial sound processing," in *Proc. Intl. Workshop Acoust. Signal Enhancement (IWAENC)*, September 2012.

[20] R. K. Cook, R. V. Waterhouse, R. D. Berendt, S. Edelman, and M. C. Thompson Jr., "Measurement of correlation coefficients in reverberant sound fields," *The Journal of the Acoustical Society of America*, vol. 27, no. 6, pp. 1072-1077, 1955.

[21] O. L. Frost, III, "An algorithm for linearly constrained adaptive array processing," *Proc. IEEE*, vol. 60, no. 8, pp. 926-935, August 1972.

[22] R. Roy and T. Kailath, "ESPRIT-estimation of signal parameters via rotational invariance techniques," *Acoustics, Speech and Signal Processing, IEEE Transactions on*, vol. 37, no. 7, pp. 984-995, July 1989.

[23] B. Rao and K. Hari, "Performance analysis of root-music*," in *Signals, Systems and Computers, 1988. Twenty-Second Asilomar Conference on*, vol. 2, 1988, pp. 578-582.

[24] H. Cox, R. M. Zeskind, and M. M. Owen, "Robust adaptive beamforming," *IEEE Trans. Acoust., Speech, Signal Process.*, vol. 35, no. 10, pp. 1365-1376, October 1987.

[25] J. B. Allen and D. A. Berkley, "Image method for efficiently simulating small-room acoustics," *J. Acoust. Soc. Am.*, vol. 65, no. 4, pp. 943-950, April 1979.

[26] E. A. P. Habets. (2008, May) Room impulse response (RIR) generator. [Online]. Available: http://home.tiscali.nl/ehabets/rirgenerator.html; see also: http://web.archive.org/web/20120730003147/http://home.tiscali.nl/ehabets/rir_generator.html

[27] I. CVX Research, "CVX: Matlab software for disciplined convex programming, version 2.0 beta," http://cvxr.com/cvx, September 2012.

[28] M. Grant and S. Boyd, "Graph implementations for nonsmooth convex programs," in *Recent Advances in Learning and Control*, ser. Lecture Notes in Control and Information Sciences, V. Blondel, S. Boyd, and H. Kimura, Eds. Springer-Verlag Limited, 2008, pp. 95-110.

[29] H. L. Van Trees, *Detection, Estimation, and Modulation Theory: Part IV: Optimum Array Processing*. John Wiley & Sons, April 2002, vol. 1.

The invention claimed is:

1. An audio filter for generating an audio output signal, comprising a plurality of audio output signal samples, based on two or more input audio microphone signals, wherein the audio output signal and the two or more input audio microphone signals are represented in a time-frequency domain, wherein each of the plurality of audio output signal samples is assigned to a time-frequency bin of a plurality of time-frequency bins, and wherein the audio filter comprises:

a weights generator being configured for receiving, for each of the plurality of time-frequency bins, direction-of-arrival information of one or more sound components of one or more sound sources or position information of one or more sound sources, wherein the weights generator is configured for generating weighting information for each of the plurality of time-frequency bins depending on the direction-of-arrival information of the one or more sound components of the one or more sound sources of said time-frequency bin or depending on the position information of the one or more sound sources of said time-frequency bin; wherein the weights generator is configured for generating the weighting information for each of the plurality of time-frequency bins depending on first noise information indicating information on a first coherence matrix of first noise components of the two or more input audio microphone signals and depending on second noise information indicating information on a second coherence matrix of second noise components of the two or more input audio microphone signals; and an output signal generator for generating the audio output signal by generating for each of the plurality of time-frequency bins one of the plurality of audio output signal samples, which is assigned to said time-frequency bin, depending on the weighting information of said time-frequency bin and depending on an audio input sample, being assigned to said time-frequency bin, of each of the two or more input audio microphone signals, wherein the audio filter is implemented using a hardware apparatus or using a computer or using a combination of a hardware apparatus and a computer.

2. The audio filter according to claim 1, wherein the weights generator is configured to generate the first noise information by employing statistical information, and wherein weights generator is configured to generate the second noise information without employing the statistical information, wherein the statistical information is predefined.

3. The audio filter according to claim 1,
wherein the weights generator is configured for generating the weighting information for each of the plurality of time-frequency bins depending on the formula:

$w_{nd} = \Phi_u^{-1} A [A^H \Phi_u^{-1} A]^{-1} g$, wherein $\phi_u = \phi_d + \phi_n$,
wherein $\phi_d$ is a first power spectral density matrix of the first noise components of the two or more input audio microphone signals,
wherein $\phi_n$ is a second power spectral density matrix of the second noise components of the two or more input audio microphone signals,
wherein A indicates the direction-of-arrival information,
wherein $w_{nd}$ is a vector indicating the weighting information,
wherein $g(k,n) = [G[k|\varphi_1(k,n)] \ldots G[k|\varphi_I(k,n)]]^T$,
wherein $G[k|\varphi_1(k,n)]$ is a first real-valued or complex-valued predefined directivity function depending on the direction-of-arrival information, and
wherein $G[k|\varphi_I(k, n)]$ is a further real-valued or complex-valued predefined directivity function depending on the direction-of-arrival information.

4. The audio filter according to claim 1, wherein the weights generator is configured to determine the first noise information depending on one or more coherences between at least some of the first noise components of the two or more audio input microphone signals, wherein the one or more coherences are predefined.

5. The audio filter according to claim 1, wherein the weights generator is configured to determine the first noise information depending on a coherence matrix $\Gamma_d(k)$ indicating coherences resulting from the first noise components of the two or more input audio microphone signals, wherein the coherence matrix $\Gamma_d(k)$ is predefined.

6. The audio filter according to claim 5, wherein the weights generator is configured to determine the first noise information according to the formula:

$\Phi_d(k,n) = \phi_d(k,n) \Gamma_d(k)$, wherein $\Gamma_d(k)$ is the coherence matrix, wherein the coherence matrix is predefined,
wherein $\Phi_d(k, n)$ is the first noise information, and
wherein $\phi_d(k, n)$ is an expected power of the first noise components of the two or more input audio microphone signals.

7. The audio filter according to claim 1, wherein the weights generator is configured to determine the first noise information depending on the second noise information and depending on the direction-of-arrival information.

8. The audio filter according to claim 1,
wherein the weights generator is configured to generate the weighting information as a first weighting information $w_\Psi$, and
wherein the weights generator is configured to generate the first weighting information by determining second weighting information,
wherein the weights generator is configured to generate the first weighting information $w_\Psi$ by applying the formula $$w_\Psi = \underset{w}{\operatorname{argmin}} \; w^H w$$

such that the formula $w^H a[k|\varphi_l(k,n)] = 0$, is satisfied,
wherein $\varphi_l(k, n)$ indicates the direction-of-arrival information,
wherein $a[k|\varphi_l(k, n)]$ indicates a propagation vector, and
wherein w indicates the second weighting information.

9. The audio filter according to claim 8, wherein the weights generator is configured to generate a diffuse-to-noise information or a power of a diffuse component depending on the second weighting information and depending on the two or more input audio microphone signals to determine the first weighting information.

10. The audio filter according to claim 1, wherein the weights generator is configured to determine the weighting information by applying a parametric Wiener filter, wherein the parametric Wiener filter depends on statistical information on a signal component of the two or more input audio microphone signals, and wherein the parametric Wiener filter depends on statistical information on a noise component of the two or more input audio microphone signals.

11. The audio filter according to claim 1, wherein the weights generator is configured to determine the weighting information depending on the direction-of-arrival information indicating a direction of arrival of one or more plane waves.

12. The audio filter according to claim 1,
wherein the weights generator comprises a transfer function selection module for providing a predefined transfer function, and wherein the weights generator is configured to generate the weighting information depending the direction-of-arrival information and depending on the predefined transfer function.

13. The audio filter according to claim 12, wherein the transfer function selection module is configured to provide the predefined transfer function so that the predefined transfer function indicates an arbitrary pick-up pattern depending on the direction-of-arrival information, so that the predefined transfer function indicates a loudspeaker gain depending on the direction-of-arrival information, or so that the predefined transfer function indicates a head-related transfer function depending on the direction-of-arrival information.

14. A method for generating an audio output signal, comprising a plurality of audio output signal samples, based on two or more input audio microphone signals, wherein the audio output signal and the two or more input audio microphone signals are represented in a time-frequency domain, wherein each of the plurality of audio output signal samples is assigned to a time-frequency bin of a plurality of time-frequency bins, and wherein the method comprises:

receiving, for each of the plurality of time-frequency bins, direction-of-arrival information of one or more sound components of one or more sound sources or position information of one or more sound sources, generating weighting information for each of the plurality of time-frequency bins depending on the direction-of-arrival information of the one or more sound components of the one or more sound sources of said time-frequency bin or depending on the position information of the one or more sound sources of said time-frequency bin; wherein generating the weighting information for each of the plurality of time-frequency bins is conducted depending on first noise information indicating information on a first coherence matrix of first noise components of the two or more input audio microphone signals and depending on second noise information indicating information on a second coherence matrix of second noise components of the two or more input audio microphone signals; and generating the audio output signal by generating for each of the plurality of time-frequency bins one of the plurality of audio output signal samples, which is assigned to said time-frequency bin, depending on the weighting information of said time-frequency bin and depending on an audio input sample, being assigned to said time-frequency bin, of each of the two or more input audio microphone signals, wherein the method is performed using a hardware apparatus or using a computer or using a combination of a hardware apparatus and a computer.

15. A non-transitory computer-readable medium comprising a computer program for implementing the method of claim 14 when being executed on a computer or signal processor.

* * * * *